United States Patent [19]

Tachihara et al.

[11] 4,367,387
[45] Jan. 4, 1983

[54] ELECTRONIC CONTROLLED HEAT COOKING APPARATUS

[75] Inventors: Jin Tachihara, Oumihachiman; Hideaki Koyama, Otsu, both of Japan

[73] Assignee: Sanyo Electric Co., Ltd., Moriguchi, Japan

[21] Appl. No.: 147,111

[22] Filed: May 6, 1980

[30] Foreign Application Priority Data

| | | | |
|---|---|---|---|
| May 15, 1979 | [JP] | Japan | 54-60055 |
| May 17, 1979 | [JP] | Japan | 54-61153 |
| Jun. 13, 1979 | [JP] | Japan | 54-75025 |
| Jun. 13, 1979 | [JP] | Japan | 54-75027 |

[51] Int. Cl.³ .................................................. H05B 9/06
[52] U.S. Cl. ............................ 219/10.55 B; 219/506; 219/493; 364/900
[58] Field of Search ............... 219/490, 492, 493, 501, 219/10.55 B, 506; 364/900; 58/39.5, 152 B; 307/252 VA, 117

[56] References Cited

U.S. PATENT DOCUMENTS

| | | | |
|---|---|---|---|
| 3,407,279 | 10/1968 | Greenberg | 219/10.55 B |
| 3,846,607 | 11/1974 | Bucksbaum | 219/10.55 B |
| 3,974,472 | 8/1976 | Gould, Jr. | 219/506 |
| 4,011,428 | 3/1977 | Fosnough et al. | 219/10.55 B |
| 4,040,248 | 8/1977 | Laesser | 58/38 R |
| 4,046,991 | 9/1977 | Sefton et al. | 219/497 |
| 4,225,776 | 9/1980 | Meisner et al. | 219/492 |
| 4,233,498 | 11/1980 | Payne et al. | 219/492 |

FOREIGN PATENT DOCUMENTS

| | | | |
|---|---|---|---|
| 1060116 | 8/1979 | Canada | 219/10.55 B |
| 1544035 | 4/1979 | United Kingdom | 58/38 R |

OTHER PUBLICATIONS

"McGraw—Hill Dictionary of Technical Terms", copyright 1974, p. 639.

*Primary Examiner*—M. H. Paschall
*Attorney, Agent, or Firm*—Darby & Darby

[57] ABSTRACT

A microwave oven is controlled to cause a magnetron to oscillate for a set timer time period. The timer time period is set by a device for entering a timer time period. The device comprises a displaceable operation knob provided and a code signal generator for generating a Gray code signal in association with the displaced amount of the operation knob. The generated code signal is converted into a binary coded decimal signal and is further converted into a time period signal, whereupon the same is stored as a timer time period. The magnetron is controlled to oscillate for an oscillation time period responsive to the timer time period as stored, while the set timer time period is down counted for each second in accordance with the lapse of the oscillation time period of the magnetron. The left time period obtained as a result of such down count is displayed by the digital display.

35 Claims, 26 Drawing Figures

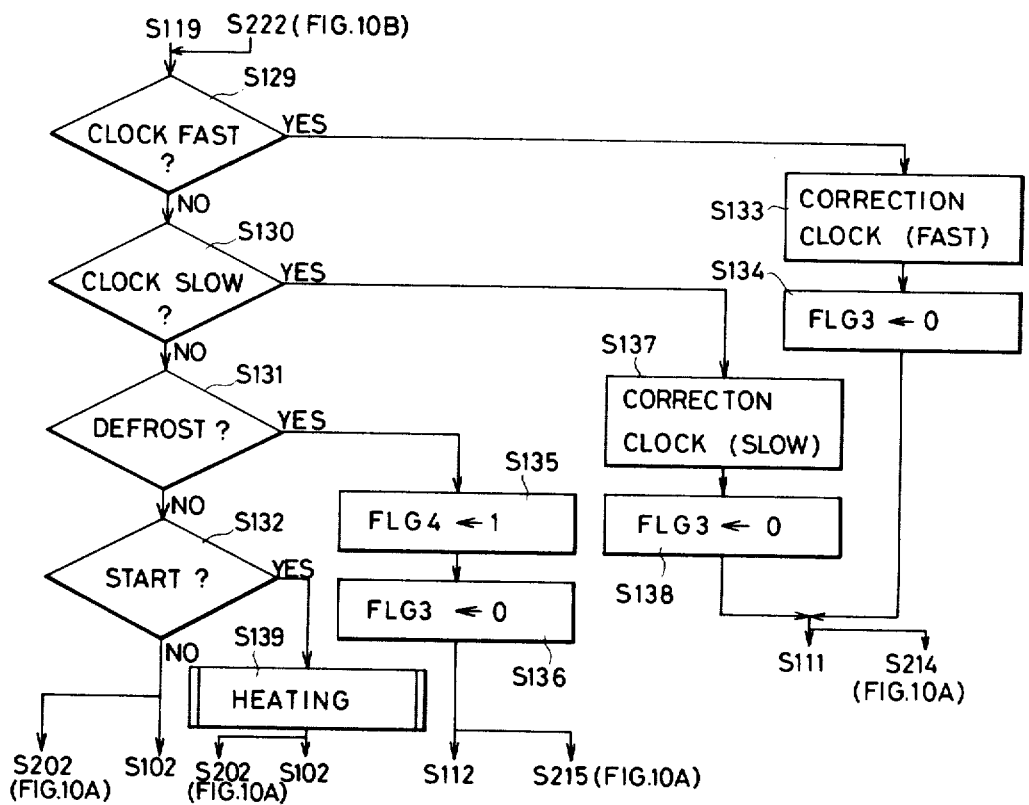

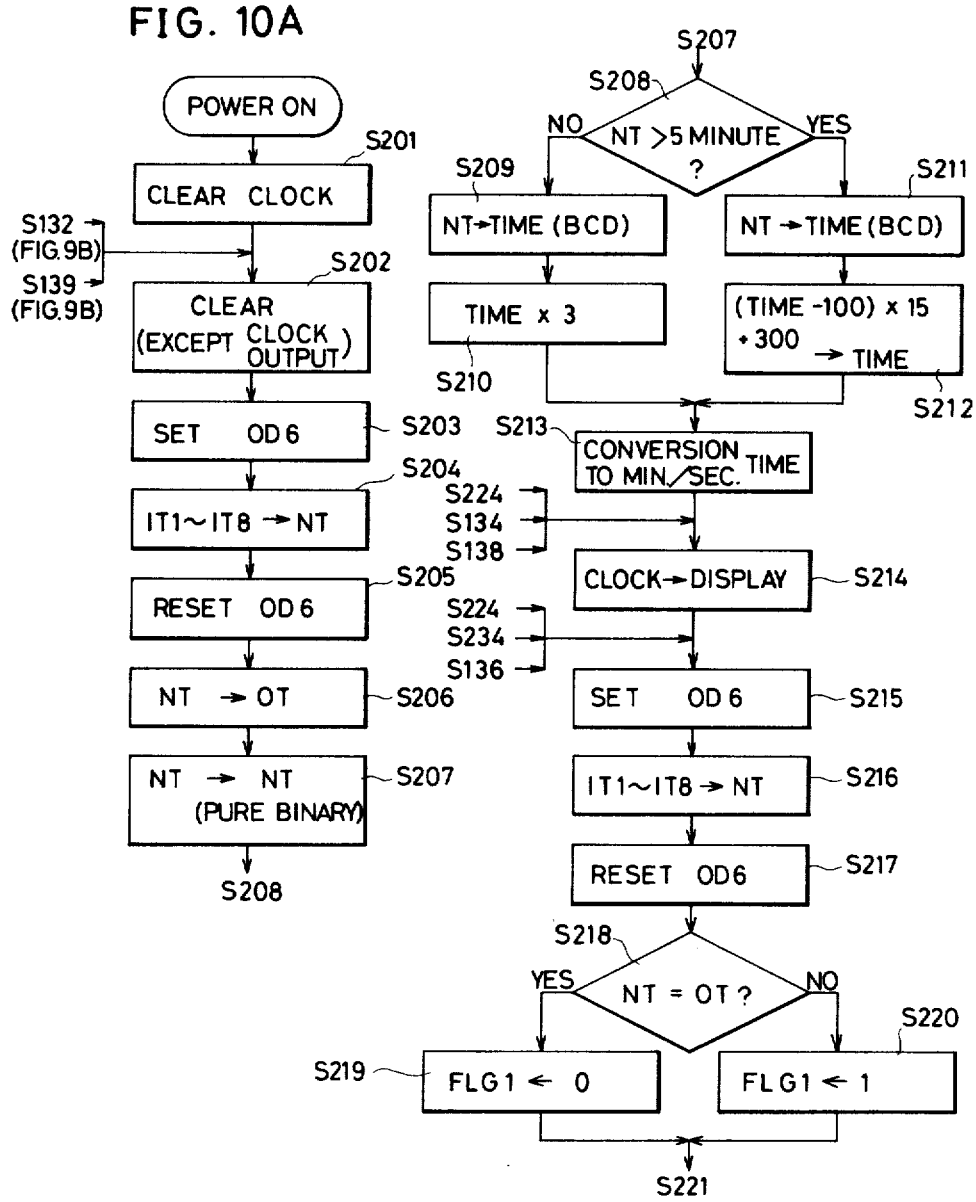

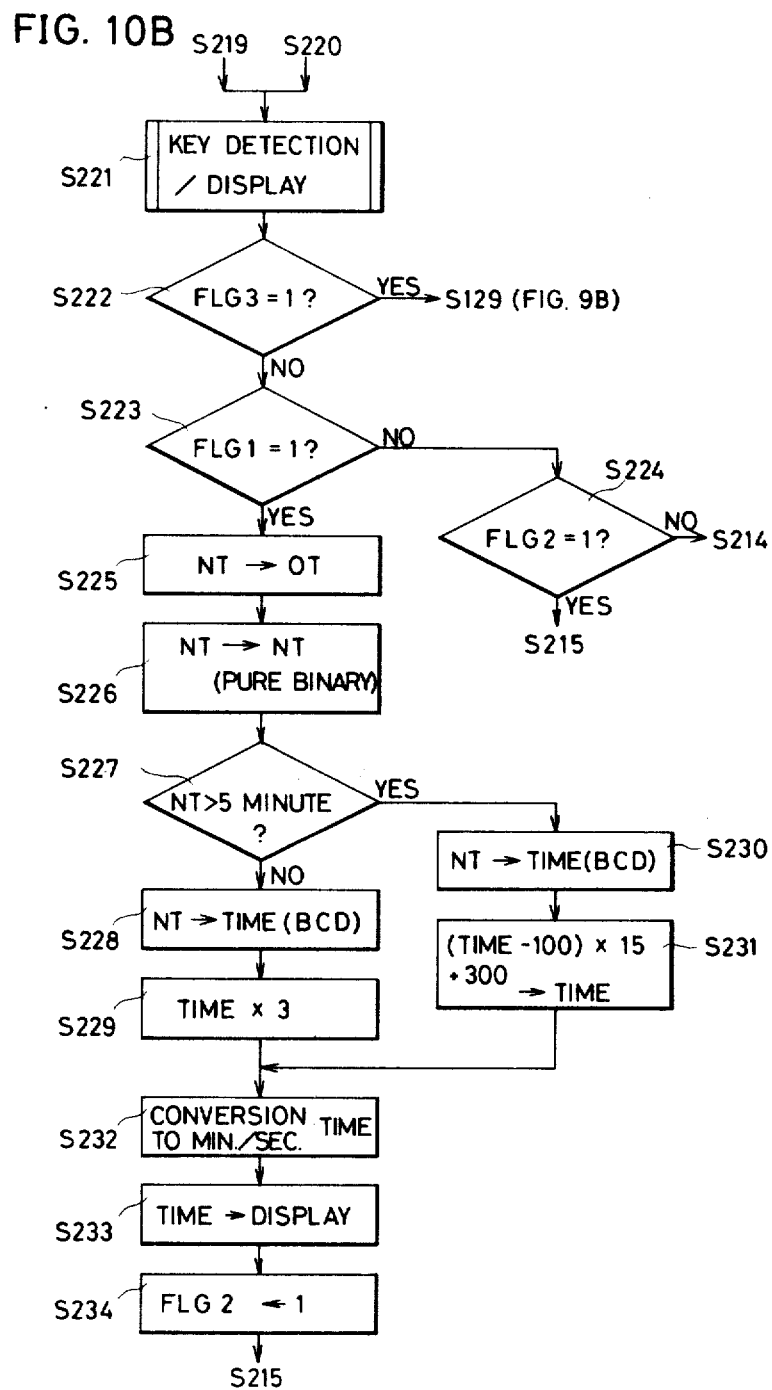

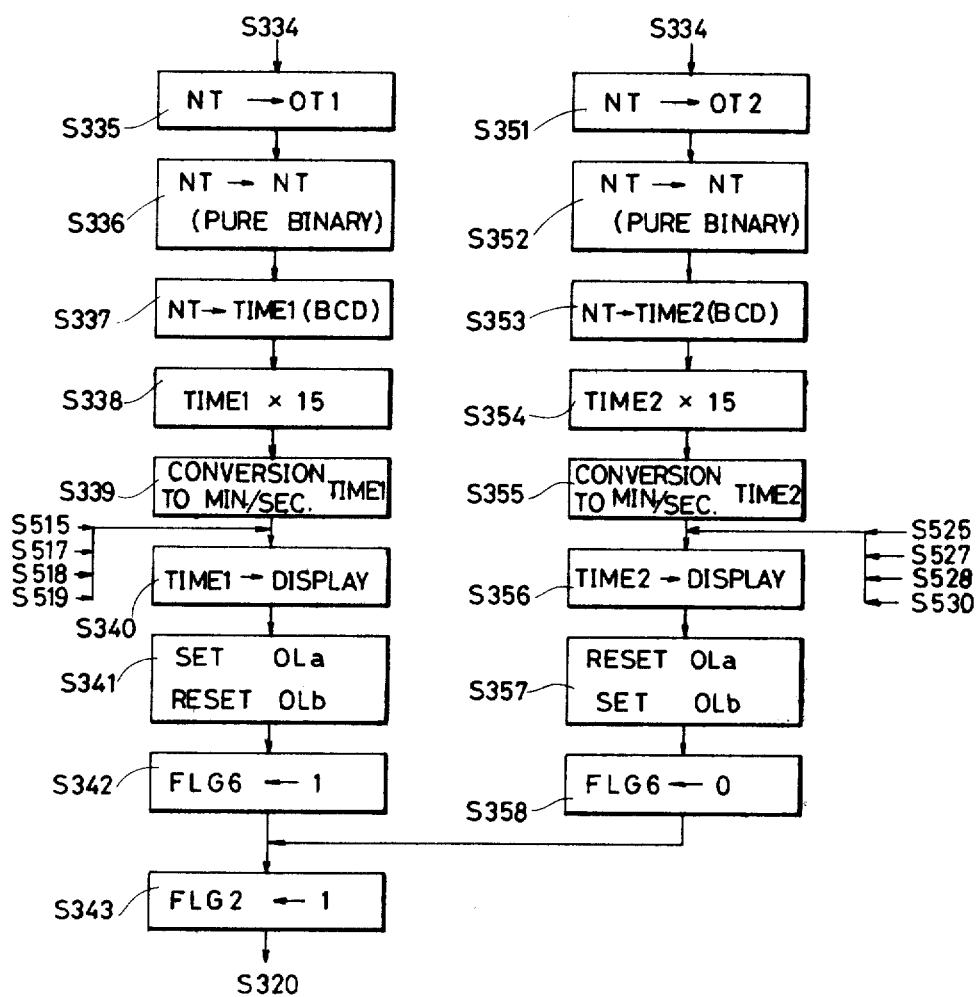

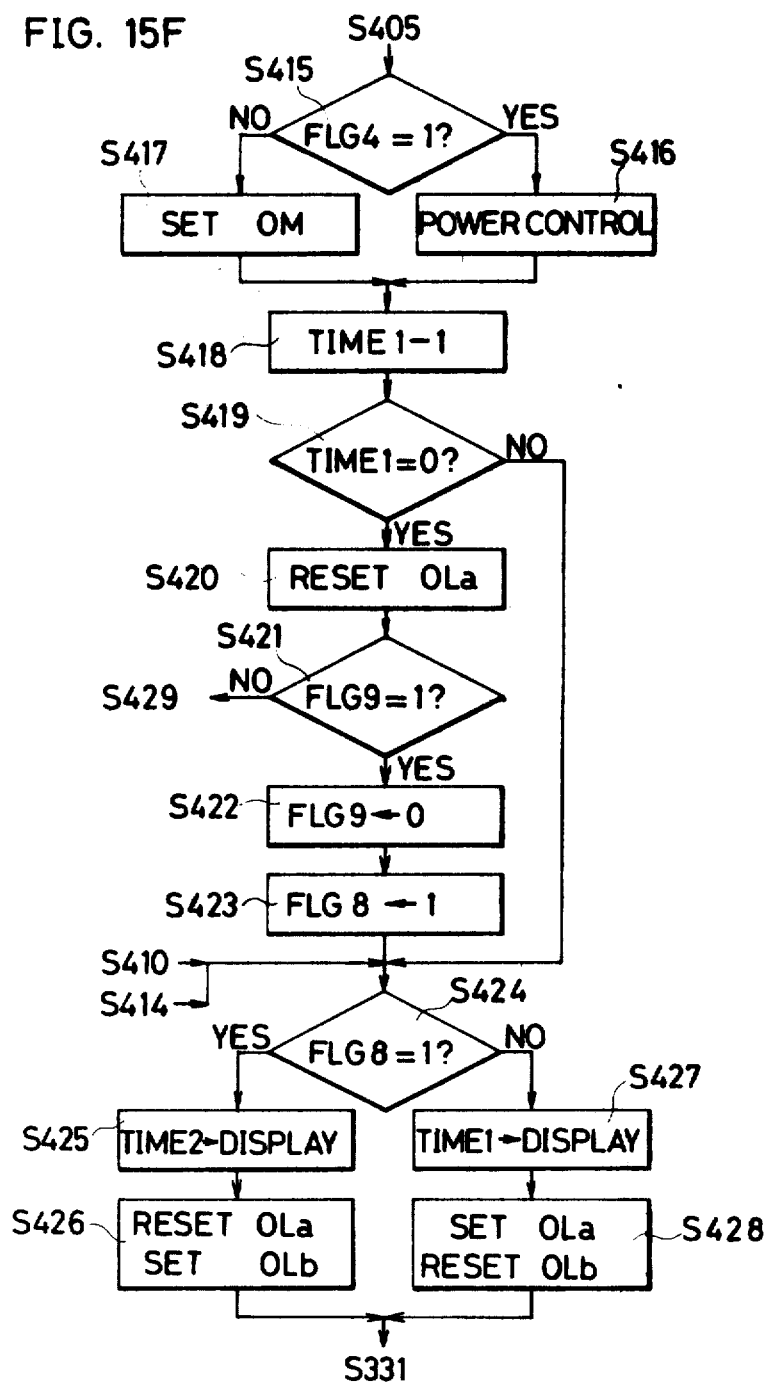

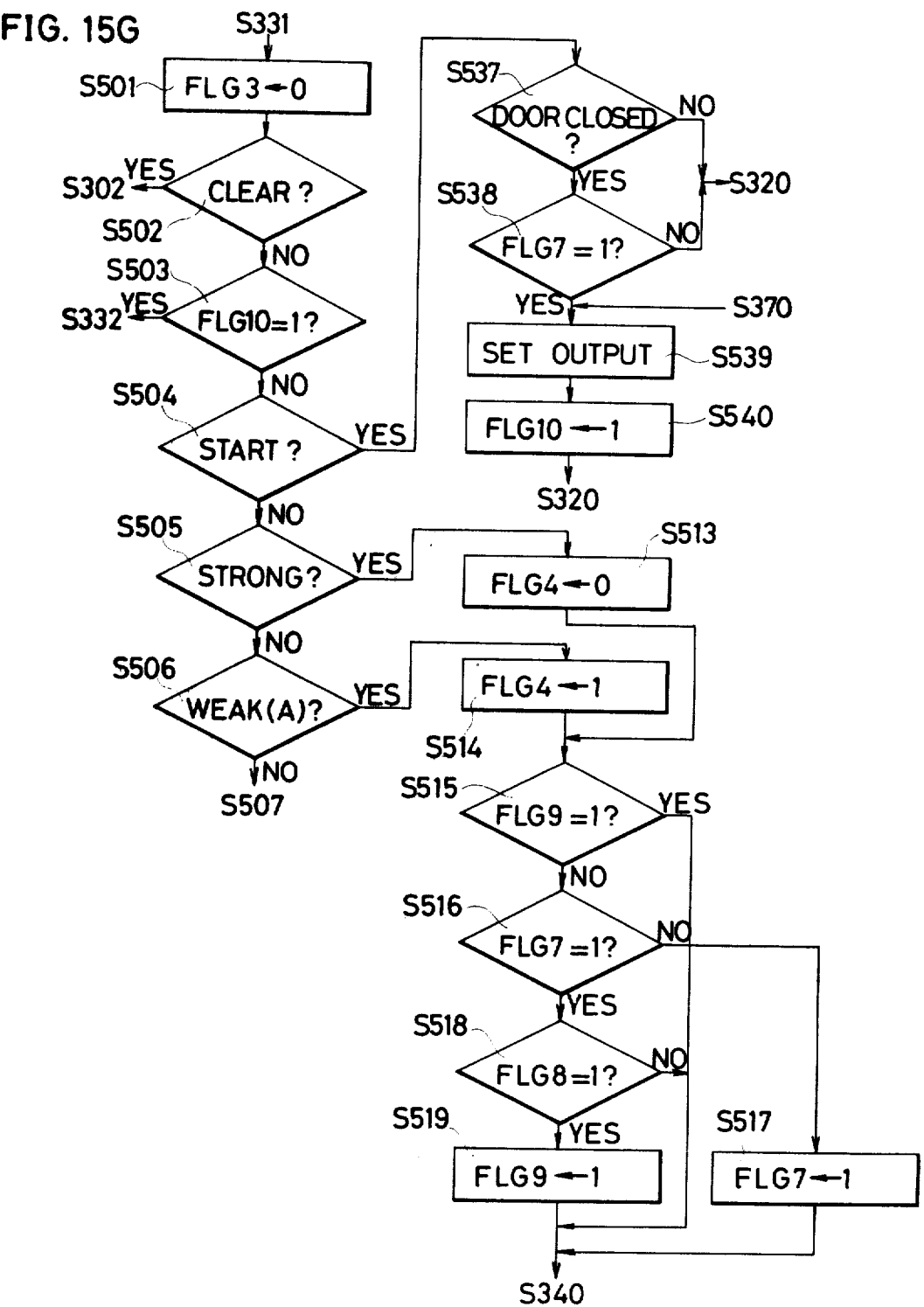

ELECTRONIC CONTROLLED HEAT COOKING APPARATUS

BACKGROUND OF THE INVENTION

1. Field of the Invention

The present invention relates to an electronic controlled heat cooking apparatus. More specifically, the present invention relates to an electronic controlled heat cooking apparatus such as a microwave oven which is capable of a timer operation mode.

2. Description of the Prior Art

Of late a microprocessor has been utilized in a heat cooking apparatus such as a microwave oven, in the light of the advantage that a variety of cooking modes can be performed with a relatively simple structure. In case of such an electronic controlled heat cooking apparatus employing a microprocessor, it is necessary to enter information for control to the microprocessor. It has been common that entry means of the so-called ten-key type has been employed as such information entry means. Accordingly, even in entering a timer time period for the purpose of a timer operation mode, for example, the ten-key type entry means had to be operated; however, it was not easy to operate such entry means for setting the above described timer time period to an operator not familiar with an arrangement of keys in the ten-key type entry means.

Although a conventional cooking apparatus is structured to display by a display means at the beginning the timer time period entered by the above described cooking input operation, the display means was merely adapted to indicate only the left time period after once a heating operation is initiated. Accordingly, it was impossible to confirm the timer time period originally entered after the heat operation is completed, even when it is desired to confirm such timer time period.

Furthermore, according to the conventional apparatus, it was impossible to change the timer time period once set, after the above described heat operation is started. Even if such change is feasible in the conventional apparatus, complicated and tiresome key operations were required, which makes it impossible to quickly change the set timer time period as necessary.

SUMMARY OF THE INVENTION

Briefly described, the present invention comprises an entry apparatus for entering a timer time period, which comprises an operation knob provided to be displaceable from the origin position over a predetermined range, and a code signal generator responsive to a displaced amount of the operation knob from the origin position for generating a code signal. The code signal is set or stored as a timer time period after code conversion as necessary. Accordingly, a heating energy generating means such as a magnetron is controlled to perform a heat operation only for the set timer time period.

According to the present invention, even in case of an electronic controlled heat cooking apparatus employing a microprocessor, it is not necessary to employ entry means of such as the ten-key type required conventionally as a timer time period entry means and as a result a manual operation for setting a timer time period becomes extremely simple.

In a preferred embodiment of the present invention, the operation knob is structured such that even after a displacing operation of the knob is terminated or released the knob remains at the set position and each time the knob is displaced a new timer time period is set. Therefore, according to the above described preferred embodiment of the present invention, when it is intended to confirm the timer time period originally set after the heat cooking operation is completed, such confirmation can be made with ease through a look at the position of the knob.

According to another preferred embodiment of the present invention the set timer time period is subtracted responsive to the lapse of the operation time period of the heating energy generating means, with the result that a left time period is evaluated from time to time. Such left time period is displayed by a display. Such display is adapted to display the current time in a standby state of the cooking apparatus and is switched to display automatically the set time period or the left time period when the timer operation knob is displaced. Accordingly, the above described preferred embodiment of the present invention eliminates necessity of any particular function key for switching the display from the current time to the timer time period (or the left time period), which was required in the conventional electronic controlled heat cooking apparatus of this type, with the result that convenience of operation is much enhanced.

According to a further preferred embodiment of the present invention, the displacement range of the timer operation knob is sectioned in at least two sections. In setting a timer time period, the weight of the time amount for unit displacement amount is processed differently depending on which one of the above described two sections the timer operation knob is positioned. Therefore, according to the above described preferred embodiment of the present invention, both the time setting in a fine manner for a relatively short time period and the time setting in a rough manner for a longer time period can be made by means of one operation apparatus. Therefore, according to the embodiment in discussion, a short time period timer and a long period timer can be implemented with single means without degrading convenience of operation and with a simple structure.

According to still a further preferred embodiment of the present invention, an electronic controlled heat cooking apparatus such as a microwave oven comprises a cooking chamber, which is provided with a door in an openable/closable manner. When the door is in an opened state, setting of a new timer time period is prohibited, even when the operation knob is displaced to a new position. Therefore, according to the preferred embodiment, even if the door is opened in the course of a heat operation and the operation knob is displaced due to a shock of the opening or for some reason, such displacement of the knob is disregarded. Therefore, according to the embodiment, even when the operation knob is undesirably displaced due to entry in or removal from the cooking chamber of a material being cooked while the door is opened or due to shock of the closing of the door thereafter, the set timer time period is prevented from being influenced, with the result that erroneous setting of a timer time period can be effectively prevented.

Accordingly, a principal object of the present invention is to provide an electronic controlled heat cooking apparatus, wherein a timer time period can be set with a simple operation in an electronic manner.

Another object of the present invention is to provide an electronic controlled heat cooking apparatus, wherein a long time timer and a short time timer can be implemented with one means, whereby an entry operation can be made with ease and with a simple structure.

A further object of the present invention is to provide an electronic controlled heat cooking apparatus, wherein a display of the current time and a set timer time period can be made with one display means, without necessity of excessive keys and hence excessive key operation.

Still a further object of the present invention is to provide an electronic controlled heat cooking apparatus, wherein an undesired change of the timer time period can be effectively prevented.

Still another object of the present invention is to provide an electronic controlled heat cooking apparatus, wherein the timer time period as originally set can be confirmed with ease during a heat operation and even after the heat operation is completed.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 9A and 9B are flow diagrams for explaining a preferred embodiment of the present invention;

FIGS. 10A and 10B are flow diagrams for showing another preferred embodiment of the present invention;

FIG. 11 is a view showing a modification of the embodiment depicted in conjunction with FIGS. 10A and 10B;

FIGS. 15A to 15H are flow diagrams for describing the above described embodiment.

DESCRIPTION OF THE PREFERRED EMBODIMENTS

In the following detailed description of the preferred embodiments of the present invention, the present invention will be described as advantageously employed in a microwave oven. However, it should be pointed out that the present invention is not limited to such embodiments but the present invention can be employed in any other types of heat cooking apparatuses for cooking a material being cooked by application of heat thereto, such as a gas oven, an electric oven, an electric grill, an electric roaster and the like.

Figure 1:
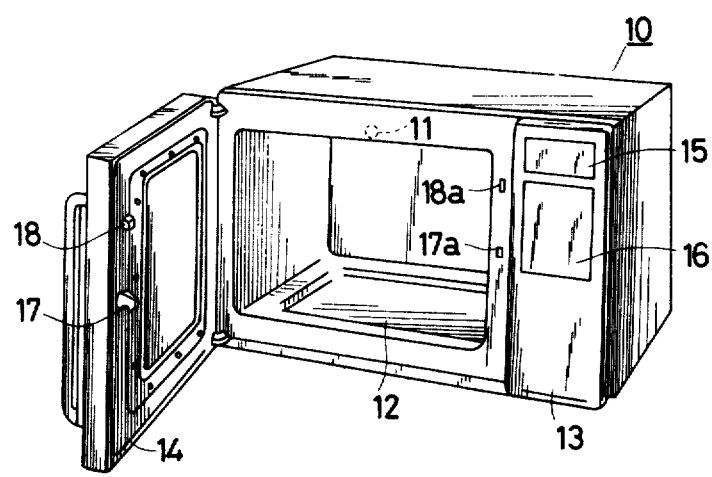
FIG. 1 is a perspective view of a microwave oven shown as one example of an electronic controlled heat cooking apparatus, which constitutes the background of the invention and wherein the present invention can be advantageously employed.

FIG. 1 is a perspective view of a microwave oven embodying the present invention. A microwave oven 10 has a main body comprising a cooking chamber 12 and a control panel 13. The main body of the microwave oven has a door 14 openably/closably provided to enclose an opening of the cooking chamber 12. The control panel 13 comprises an operation portion 16 for setting various cooking modes and for entering necessary data, and a display 15 for displaying in a digital manner the entered data, a measured temperature, a time period left in a timer, and the like. The display portion 15 and the operation portion 16 will be described in more detail subsequently. The door 14 is provided with a door latch 17 and a door switch knob 18 on the inner surface thereof. The door latch 17 and the door switch knob 18 are adapted to enter into apertures 17a and 18a, respectively, formed on the main body, when the door 14 is closed, so that an interlock switch and a door switch, respectively, shown in FIG. 6, may be turned on.

Figure 6:
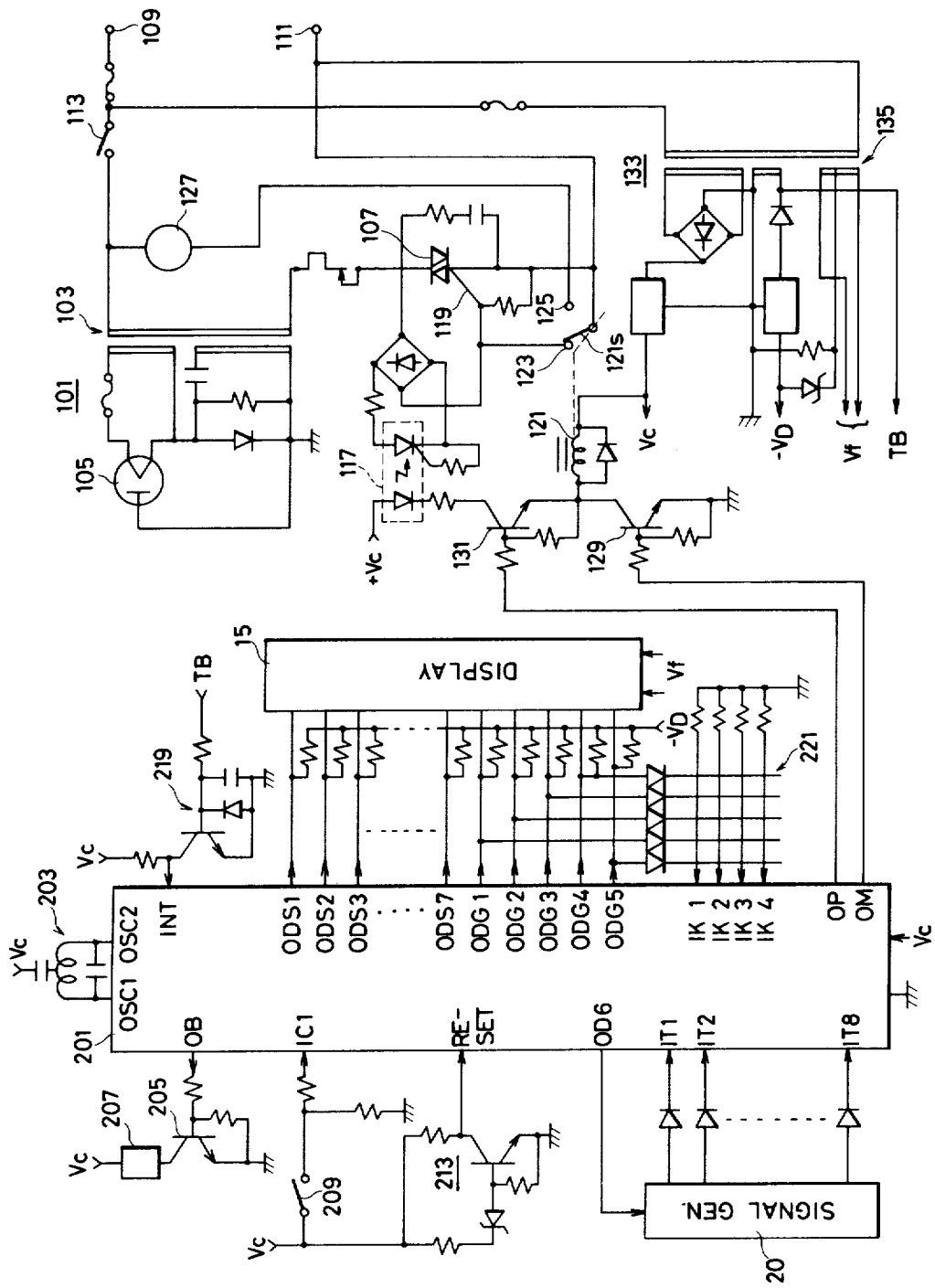
FIG. 6 is a schematic diagram of one embodiment of the present invention.

FIG. 6 is a schematic diagram of a preferred embodiment of the present invention. A microwave generating portion 101 is coupled to terminals 109 and 111 of a commercial power supply through an interlock switch 113 and a bidirectional thyristor 107. The microwave generating portion 101 is structured in a well known manner and may comprise a high voltage transformer 103 for transforming a source voltage obtained from the terminals 109 and 111, a magnetron 105 coupled to the output winding of the high voltage transformer 103, and the like. The interlock switch 113 is adapted to be turned on by means of the door latches 17 and 17a, shown in FIG. 1. The bidirectional thyristor 107 is rendered conductive if and when the output voltage of a photocoupler 117 is applied to the gate electrode 119 thereof. Accordingly, if and when the door 14 shown in FIG. 1 is closed and the output voltage is obtained from the photocoupler 117, an alternating source voltage obtained from the terminals 109 and 111 is applied to the microwave generating portion 101 and accordingly a microwave is generated from the microwave generating portion 101, which microwave energy is supplied to the cooking chamber 12 shown in FIG. 1. The photocoupler 117 becomes operative if and when a first and second transistors 129 and 131 are both rendered conductive, whereby an output voltage is withdrawn.

The gate electrode 119 of the bidirectional thyristor 107 is coupled to the voltage source terminal 111 through a normally closed contact 123 of a relay 121. Accordingly, the thyristor 107 is normally short-circuited and therefore the gate electrode 119 is prevented from being undesirably supplied with a voltage due to an external noise and the like and hence the bidirectional thyristor 107 is prevented from being undesirably rendered conductive. The relay 121 is energized when the first transistor 129 is rendered conductive, a normally opened contact 125 of the relay 121 being connected to a blower motor 127. The blower motor 127 is adapted for driving a fan, not shown, for cooling the magnetron 105 and the like. The voltage source terminals 109 and 111 are further connected to a control voltage source 133. The control voltage source 133 comprises a transformer 135 for transforming the voltage supplied from the terminals 109 and 111 to a lower voltage for supplying direct current source voltages $V_C$ and $-V_D$ fed to various portions of the circuit, a voltage Vf fed to a display 15 and a time base signal TB.

The embodiment shown employs a one-chip microprocessor implemented as a large scale integration for controlling the above described microwave generating portion 101 and the like. The microprocessor 201 may be model "μPD553" manufactured by Nippon Electric Company Limited, Japan, for example. Such microprocessor 201 has a multiplicity of input and output terminals. Connection terminals OSC1 and OSC2 are used for connecting an external component 203 constituting a portion of a clock source. The external component 203 is cooperative with the microprocessor 201 to generate a synchronizing clock, so that the microprocessor 201 may execute the program steps in synchronism with the clock. Although not shown in the figure, the microprocessor 201 comprises a read only memory having system programs to be described subsequently, a random access memory for storing data, an arithmetic logic unit and the like, as well known to those skilled in the art.

Figure 3:
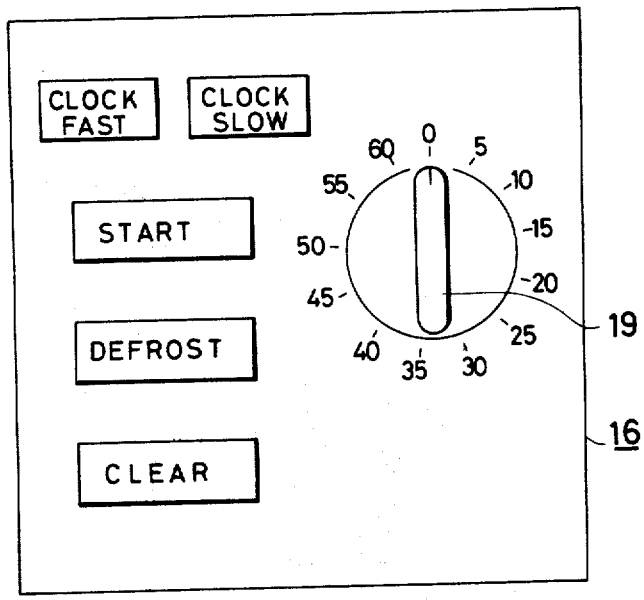
FIG. 3 is a view showing one example of an operation portion.

The microprocessor 201 is coupled to the display 15 through data output terminals ODS1 to ODS7. The display 15 is further supplied with a display control signal through control signal output terminals ODG1 to ODG5. The display control signal functions as a digit selecting signal for driving in a time sharing basis each of a number of display digits to be described subsequently of the display 15. The control signal terminals ODG1 to ODG5 are coupled to column lines of a key matrix 221. The key matrix 221 comprises four row lines connected to key input terminals IK1, IK2, IK3 and IK4 of the microprocessor 201. The above described column lines and row lines constitute a matrix, such that an intersection of each column line and each row line is provided with a key switch of the operation portion 16 (see FIG. 3). The operation portion 16 comprises five function keys, as shown in FIG. 3. The function keys comprise those keys denoted as CLOCK FAST, CLOCK SLOW, START, DEFROST, and CLEAR. The CLOCK FAST key and the CLOCK SLOW key are used for setting a time period. The DEFROST key is used for setting a defrost operation. The CLEAR key is used for clearing the set command information. The START key is used for commanding initiation of microwave generation by the magnetron 105. Each of these keys may be implemented by a typical contact type depression button switch. The input from the key matrix 221 coupled to these keys is applied to the key input terminals IK1 to IK4 as a key code signal. The microprocessor 201 is responsive to the key code signal applied to the terminals IK1 to IK4 to detect or identify which key is depressed. The timer operation knob 19 is provided on the operation portion 16. The timer operation knob 19 is rotatably provided to the signal generator 20 by means of a shaft, not shown, and the graduation for indicating an operation amount or a displacement amount of the knob is shown along the rotational periphery of the knob 19 of the operation portion 16. The graduation includes a "0" indication showing the origin position and the equispaced graduations of a five-minute interval are formed therefrom up to sixty minutes.

Figure 4:
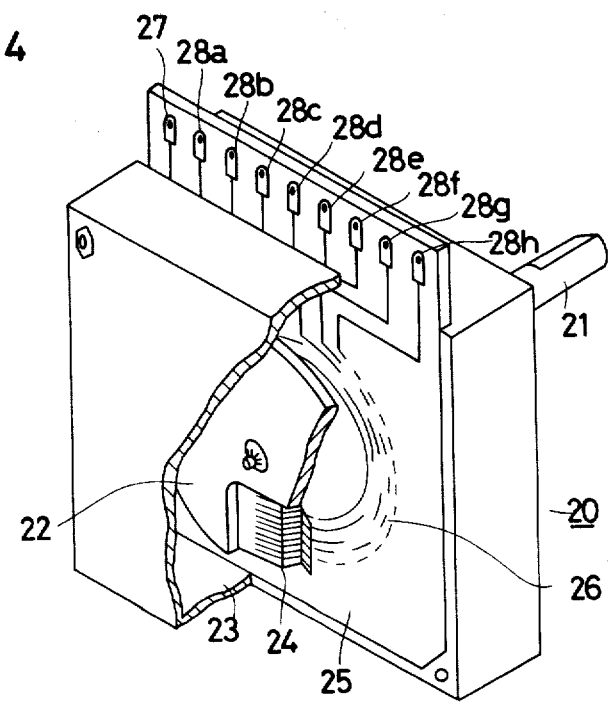
FIG. 4 is a fragmentary perspective view showing one example of a signal generator coupled in a ganged fashion with the operation knob.

FIG. 4 is a fragmentary perspective view of one example of the signal generator 20. The signal generator 20 is provided on the rear surface of the control panel 13, so that the same is operatively coupled in a ganged fashion to the above described timer operation knob 19. The signal generator 20 comprises an operation shaft 21 extending through the operation panel 13 to the front surface thereof and the operation shaft 21 is fitted to a hole, not shown, formed at the center of the rear surface of the timer operation knob 19. Accordingly, the operation shaft 21 is rotated through rotation of the operation knob 19. The other end of the operation shaft 21 extends through a print circuit board 25. A rotation plate 22 is fixed to the other end so as to be integrally rotatable with the operation shaft 21. A common base portion of the conductive brush 24 is fixed to the rotation plate 22. Accordingly, when the operation shaft 21 is rotated by the knob 19, the tip end of the brush 24 slides on the surface of the print circuit board 25. The print circuit board 25 is formed of a conductive pattern 26 along the sliding path of the brush 24. The conductive pattern 26 comprises nine conductive runs to be described subsequently. One of the nine conductive runs is connected to the common terminal 27, while the remaining eight conductive runs are connected to the corresponding first to eighth signal terminals 28a to 28h, respectively. The conductive pattern 26, the brush 24 and the rotation plate 22 are housed within a casing 22 constituting the signal generator 20.

Figure 5B:
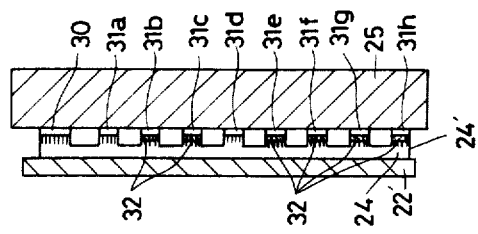
FIGS. 5A and 5B are views for explaining the FIG. 4 signal generator.
Figure 5A:
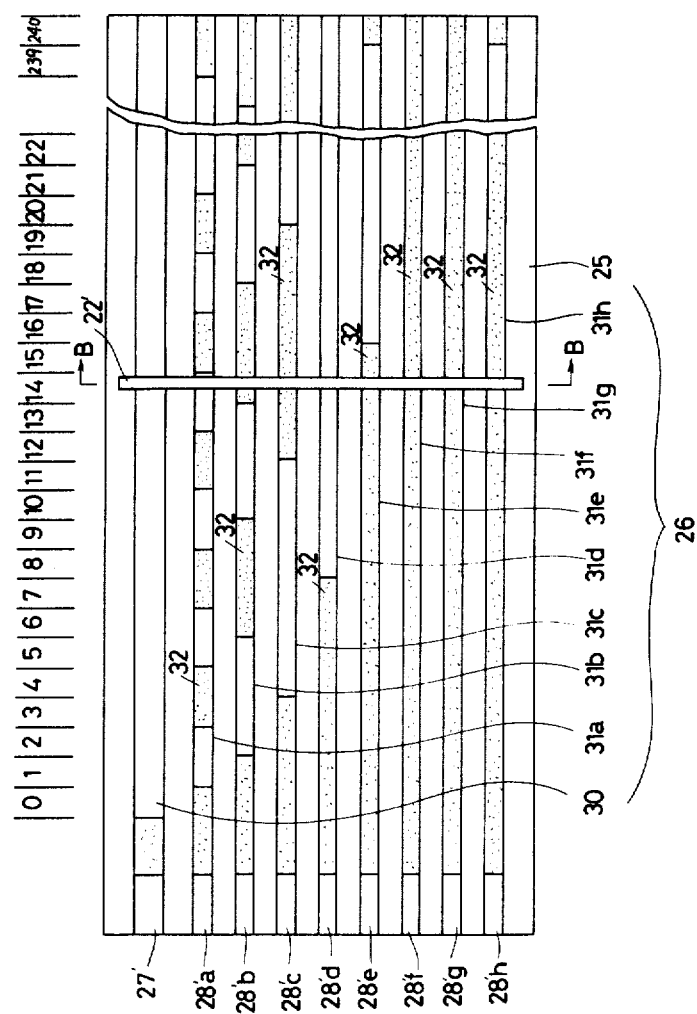

FIG. 5A is a view showing the above described conductive pattern 26 developed in a linear manner and FIG. 5B is a view showing a relation of the conductive pattern 26, the rotation plate 22 and the brush 24. Referring to FIG. 5A, the conductive pattern 26 formed on the surface of the print circuit board 25 comprises one common run 30, and the first to eighth signal runs 31a to 31h, the common run and the signal runs being formed to extend in parallel. It would be appreciated that the movement of the brush 24 shown in FIG. 4 is equivalent to the movement along the extension direction of the conductive pattern 26 in FIG. 5A of the brush 24' extending perpendicular to the extension direction of the conductive pattern 26 in sliding contact with the common run 30 and the respective signal runs 31a to 31h.

The conductive pattern 26 is divided equispaced at the positions (unit portion) of 20 to 240. The position 0 is determined as the position of the brush 24' corresponding to the origin position of the operation knob 19 (FIG. 3) and the position 240 is determined as the position of the brush 24' corresponding to the position of sixty minutes of the operation knob 19. Meanwhile, referring to FIG. 5A, the reference numeral 27' corresponds to the common terminal 27 in FIG. 4, and the reference numerals 28'a to 28'h correspond to the signal terminals 28a to 28h in FIG. 4, respectively. Referring to FIG. 5A, the portions as dotted on the respective conductive runs denote a portion where the insulating film 32 has been formed, where no electrical connection is established between the run and the brush even if the brush 24' is positioned. As understood from FIG. 5A, the common run 30 has been formed such that the conductive surface may be exposed in the full range from the position (unit portion) 0 up to the position 240. The first signal run 31a is formed such that the conductive surface may be exposed at the respective positions of "$A_1+4M_1$"th, where $A_1=1$, 2 and $M_1=0$ to 59. The second signal run 31b is formed such that the conductive surface may be exposed at the respective positions represented as the "$A_2+8M_2$"th, where $A_2=2$ to 5 and $M_2=2$ to 29. The third signal run 31c is formed such that the conductive surface may be exposed at the respective positions represented as the "$A_3+16M_3$"th, where $A_3=4$ to 11 and $M_3=0$ to 14. The fourth signal run 31d is formed such that the conductive surface may be exposed at the respective positions represented as the "$A_4+32M_4$"th, where $A_4=8$ to 23 and $M_4=0$ to 7. The fifth signal run 31e is formed such that the conductive surface may be exposed at the respective positions represented as the "$A_5+64M_5$"th, where $A_5=16$ to 47 and $M_5=0$ to 3. The sixth signal run 31f is formed such that the conductive surface may be exposed at the respective positions as represented as the "$A_6+128M_6$"th, where $A_6=32$ to 95 and $M_6=0$ to 1. The seventh signal run 31g is formed such that the conductive surface may be exposed at the respective positions as represented as the "$A_7$"th, where $A_7=64$ to 191. The eighth signal run 31h is formed such that the conductive surface may be exposed at the respective positions as represented as the "$A_8$"th, where $A_8=128$ to 239.

The signal generator 20 generates a code signal corresponding to an operated amount or a displaced amount of the control knob 19 (FIG. 3). Consider a case where the brush 24' is at the fourteenth position, for example, as shown in FIG. 5A. One pulse is applied from the output terminal OD6 of the microprocessor 201 (FIG. 6) to the common terminal 27'. Then, the pulse signal is applied through the common terminal 27' and the common run 30 and through the brush 24' to the respective signal runs 28'a to 28'h. However, as far as the fourteenth position is concerned, only the first and fourth signal runs 31a and 31d have been formed such that the conductive surface may be exposed at that position. Accordingly, the above described pulse signal appears only at the first and fourth signal terminals 28'a and 28'd corresponding to the above described signal runs 31a and 31d. Accordingly, assuming that the presence or absence of the above described pulse signal corresponds to the logic one or zero, then the signal generation state at the respective signal terminals 28'a to 28'h corresponding to the respective signal runs 31a to 31h becomes "10010000". Likewise, the signal generation state at the other positions may be listed as shown in the following table.

TABLE

| Position | Signal Generation State | | | | | | | |
|---|---|---|---|---|---|---|---|---|
| 0 | 0 | 0 | 0 | 0 | 0 | 0 | 0 | 0 |
| 1 | 1 | 0 | 0 | 0 | 0 | 0 | 0 | 0 |
| 2 | 1 | 1 | 0 | 0 | 0 | 0 | 0 | 0 |
| 3 | 0 | 1 | 0 | 0 | 0 | 0 | 0 | 0 |
| 4 | 0 | 1 | 1 | 0 | 0 | 0 | 0 | 0 |
| 5 | 1 | 1 | 1 | 0 | 0 | 0 | 0 | 0 |
| . | . | . | . | . | . | . | . | . |
| . | . | . | . | . | . | . | . | . |
| . | . | . | . | . | . | . | . | . |

As apparent from the above described table, by displacing the operation knob 19, a code signal of eight bits corresponding to the position of the brush 24' corresponding to the displacement is obtained. It is noted that a signal corresponding to the adjacent position contains only a variation of one bit. Such a code signal including a variation on a one bit by one bit basis is known as the so-called Gray code or the reflected binary code. The fact that the code signal obtained from the signal generator 20 is represented by the Gray code means that even in a state of the brush 24' at the boarder of two adjacent positions the resultant code signal in such a situation comes to correspond to either of the two adjacent positions. Accordingly, even in such a situation, a code signal corresponding to either position is obtained, whereby any malfunction is avoided in such a critical position.

The microprocessor 201 comprises an output terminal OD6 for providing the above described pulse signal to the signal generator 20. The microprocessor 201 further comprises input terminals IT1 to IT8 for receiving the code signal of eight bits generated at the signal terminals 28a to 28h (FIG. 4) corresponding to the displacement amount of the operation knob 19. The code signal of eight bits can assume 241 different combinations corresponding to 241 different positions. Accordingly, assuming that the portion of the conductive pattern 26 corresponding to the range of 0 to 60 minutes indicated on the periphery of the operation knob 19 is divided into 240 equispaced minor unit portions, then one minor unit portion corresponds to fifteen seconds, with the result that a different code signal is obtained for every fifteen seconds in setting a timer period by the knob 19.

Figure 2:
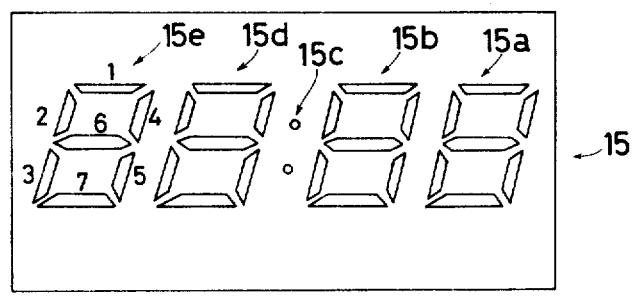
FIG. 2 is a view showing one example of a display.

The display 15 is structured as shown in FIG. 2, for example, by means of a fluorescent type display tube. More specifically, the display 15 comprises a numerical value display portion. The numerical value display portion comprises four numeral display portions 15a, 15b, 15d and 15e, each including an "8" shaped segment arrangement, and a colon display pattern 15c formed between the numeral display portions 15b and 15d. The output signal obtained from the output terminals ODG1 to ODG5 of the microprocessor 201 functions as a digit selecting signal of the respective display digits 15a to 15e. On the other hand, the output signal obtained from the output terminals ODS1 to ODS7 functions as a segment selecting signal corresponding to the respective segments in each of the numeral display portions. Accordingly, if and when a signal is obtained from the output terminal ODG2, for example, and the output signal is obtained at the terminals ODS1, ODS3, ODS4, ODS6, and ODS7 a numeral "2" is displayed at the numeral display portion 15b is enabled to emit light. The output signal obtained from the output terminal ODS7 functions as a selection signal of the colon display portion 15c. Accordingly, if and when the output signal is obtained from the output terminal ODG5 and the output signal is obtained from the terminals ODS7, the colon display portion 15c is enabled to emit light. The display 15 makes a current time display and a timer period display, such that in case of the current time display the current time of say two o'clock thirty-five minute is displayed as "2:35" and in case of the timer period display the timer period of say thirty minutes thirty second is displayed as "1330".

Returning to FIG. 6, the output terminal OB of the microprocessor 201 is a buzzer terminal. If and when an output signal is obtained at the terminal OB, the transistor 205 coupled thereto is rendered conductive, whereby the buzzer 207 is driven to raise an alarm. The buzzer 207 is used to generate a confirmation alarm responsive to a key operation of the above described operation portion 16, completion of cooking, and the like. However, the buzzer 207 may also be used as one of alarming means to be described subsequently.

The input terminal IC1 of the microprocessor 201 is an input terminal for detecting an opened/closed state of the door 14 shown in FIG. 1. More specifically, a door switch 209 adapted to be turned on responsive to the door switch knob 18 (FIG. 1) is connected to the input terminal IC1. Accordingly, in the absence of the input signal at the terminal IC1, i.e. if and when the door switch 209 is turned off, the microprocessor 201 determines that the door 14 has been opened. In such a situation, the microprocessor 201 performs necessary operations such as interruption of its own operation, and the like.

The input terminal RESET is a terminal for initially resetting the microprocessor 201 upon turning on of a power supply to the microwave oven. More specifically, if and when the power supply is turned on, the rise of the source voltage $V_C$ obtained from the control voltage source 133 is detected by means of a detecting circuit 213 implemented by a transistor and a Zener diode. The output from the detecting circuit 213 is applied to the terminal RESET. Then the microprocessor 201 resets the respective portions to an initial condition.

An interrupt signal is applied to the input terminal INT of the microprocessor 201. More specifically, the time base signal obtained from the above described control voltage source 133 is an alternating current signal of say 60 Hz and is shaped into a pulse signal of say 60 Hz by means of a wave shaping circuit 219 comprising a transistor, a diode and a capacitor, whereupon the pulse signal is applied to the input terminal INT. Each time the pulse signal obtained from the wave shaping circuit 219 is applied to the input terminal INT, the microprocessor 201 interrupts any other processing, whereupon timing processing is performed. More specifically, the microprocessor 201 functions to generate a signal representing "second", a signal representing "minute", and a signal representing "hour" in synchronism with the above described pulse signal of 60 Hz.

Finally, the output terminals OM and OP are a heat command terminal and an output level command terminal, respectively. In performing a heat processing operation, the microprocessor 201 just provides an output signal at the output terminal OM and then provides an output signal at the output terminal OP with a slight delay. Upon completion of execution of the heating operation, the output signals at the two terminals OM and OP are caused to disappear. If and when the output signal is obtained at the output terminal OM, the first transistor 129 is rendered conductive and accordingly the relay 121 is energized. Accordingly, the normally closed contact 123 is turned off and the normally opened contact 125 is turned on. Accordingly, a short circuit state of the gate electrode 119 of the bidirectional thyristor 107 is released and the blower motor 121 is energized. When the output is obtained from the output terminal OP thereafter, the second transistor 131 is rendered conductive and the photocoupler 117 becomes operative. Then the output signal at the output terminal OP is obtained for a time period associated with an output level being set within each cycle which is determined as 10 second, for example. Assuming that a microwave output generated by the magnetron 105 is selected to be the maximum level, for example, the output signal is obtained for full period of time in each cycle, and assuming that the microwave output is selected to be a 50% level, the output signal is obtained for five second, for example, within each cycle.

Figure 7:
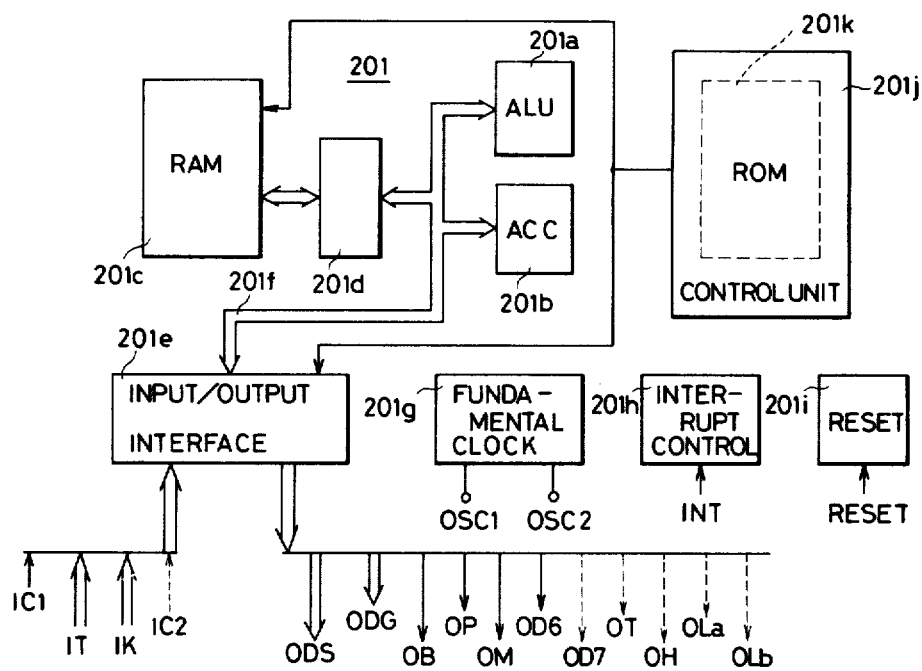
FIG. 7 is a block diagram showing a structure of a microprocessor.

FIG. 7 is a block diagram of the microprocessor 201. The microprocessor 201 comprises an arithmetic logic unit 201a, an accumulator 201b, a random access memory 201c, a random access memory buffer 201d, an input/output interface 201e and a control unit 201j. A data bus 201f is provided for communication of information between these blocks. The control unit 201j performs functions of controlling communication of information among these blocks. External input signals IC1, IT, IK1 to IK4 and external output signals ODS1 to ODS7, ODG1 to ODG5, OB, OP, OM and OD6 are inputted and outputted through the input/output interface 201e.

The microprocessor 201 further comprises a reference clock signal generator 201g, an interrupt control unit 201h and a reset unit 201i. The reference signal generator 201g cooperates with an external component 203 shown in FIG. 6 to generate a reference clock signal of 400 kHz, for example. The interrupt control unit 201h is responsive to the interrupt signal INT obtained from a wave shaping circuit 219 to command an interrupt operation for the purpose of a required timing operation. The reset unit 201i is responsive to the reset signal RESET to command a required reset operation.

The control unit 201j comprises a read only memory 2101k. The read only memory 201k contains a system program and a programmable counter, not shown, to be described subsequently.

The random access memory 201c comprises various storing regions. The major regions comprise a DISPLAY region of the length of four digits each digit including four bits, a TIME region and a CLOCK region. The random access memory 201c further comprises an NT region and an OT region each having the length of two digits and an FKB region and, an FLG region of the length of one digit. The TIME region is allotted to store a timer period and the CLOCK region is allotted to store the current time. The DISPLAY region is used as an output buffer for outputting the contents in the above described TIME region and the CLOCK region to the display portion 15. The FKB region is used to store the key code of the function key as operated among the function keys provided in the operation portion 16. The FLG region comprises the flag regions FLG1, FLG2, FLG3 and FLG4 each having one bit.

Now that a structure of a preferred embodiment of the present invention was described in the foregoing, a control operation by the microprocessor 201 will be described in detail in the following.

STANDBY STATE

As far as the microwave oven is in an enabled state, the microprocessor 201 is responsive to the input signal at the input terminal INT to perform a timing operation as described previously irrespective of a key operation by the operation portion 16 and the current time is renewed by a current time storing region which is an accessible region included in the random access memory of the microprocessor 201. Now assuming that no key operation is made by the operation portion 16 and therefore the microwave oven is in a standby state, then the current time is normally displayed by the display 15.

Now referring to the flow diagram shown in FIGS. 9A and 9B, an operation of the embodiment shown will be described. It is pointed out that in the following description the reference characters for the microprocessor 201 and the random access memory 201c will be omitted for simplicity of description.

Upon turning on of a power supply to the microwave oven, the step S101 of the program is automatically executed responsive to the input signal to the terminal RESET of the microprocessor. More specifically, at the step S101 the clock associated regions including the CLOCK region of the random access memory are cleared. The program then proceeds in succession to the steps S102 to S114.

At the step S102 all the output terminal signals of the microprocessor and all the regions of the random access memory excluding the above described clock associated regions are cleared.

At the step S103 the output is obtained at the timer time control output terminal OD6 of the microprocessor. Accordingly, the signal of eight bits associated with the position of the timer operation knob 19 is obtained from the signal generator 20 and is applied to the timer time input terminals IT1 to IT8 of the microprocessor. At the step S104 such input signals are stored as such in the NT region. Then at the step S105 the output at the output terminal $OD_6$ is reset to disappear.

At the step S106 the content in the NT region is transferred to the OT region. Meanwhile, the content in the NT region is held even after such transfer. At the step S107 the content in the NT region undergoes code conversion. More specifically, the content in the NT region is converted from the Gray code of eight bits to a binary code of eight bits through the above described code conversion. At the following step S108, the content in the NT region further undergoes code conversion, whereby the binary code of eight bits is converted into a binary coded decimal code of four digits and the converted code is stored in the TIME region. The above described code conversions at the respective steps S107 and S108 can be made by the well-known logical operation, although in the embodiment shown a specific simple approach was employed in the code conversion at the step S107. More specifically, the Gray code is converted into the binary code by using an arithmetic logical unit. Such code conversion is performed by detecting the presence or absence of the logic one in succession from the more significant bit to the less significant bit of the Gray code and by continuing an inverting operation of the content in the bit less significant than the bit of the odd ordinal number until the following bit of the logic one.

The numerical value entering in the TIME region at the step S108 coincides with the displaced amount from the origin point of the timer operation knob 19, i.e. the above described minor graduation number. Since the unit minor graduation corresponds to 15 seconds, at the following step S109 the content in the TIME region is multiplied by 15. More specifically, the content in the TIME region becomes a timer time period corresponding to the position of the timer operation knob 19 as represented in terms of the seconds. For example, assuming that the operation knob 19 is at the position of five minutes thirty seconds, the content in the time region becomes "0330". At the following step S110 the content in the time region represented by the seconds unit is converted into a representation in terms of the minute and second unit. More specifically, in the above described example, "0330" is converted into "0530".

At the step S111 the content in the CLOCK region is transferred to the DISPLAY region. The content in the At the step S115, the respective contents in the NT region and the OT region are compared and if both are equal to each other then the program proceeds through the step S116 and if both are not equal to each other the program proceeds through the step S117 to the step S118. At the steps S116 and S117, the logics zero and one are written in the FLG1 region.

At the step S118 a display is made by the display 15 and at the same time the key operation by the operation portion 16 is detected. More specifically, the outputs are in succession generated at the input/output control terminals ODG1 to ODG5 and the contents in the respective digits in the display region undergo code conversion in synchronism with the outputs at these terminals ODG1 to ODG4 and the code converted outputs are obtained at the display output terminals ODS1 to ODS7. Meanwhile, undesired zeros in the more significant digit are suppressed from being displayed at that time. The content in the FLG2 region is checked and, if and when the same is logic zero, then the output is obtained at the terminal ODS7 in synchronism with the output at the control terminal ODG5 for display of the current time, whereby a colon display is made by the display 15. On the other hand, in the case where the key operation is made by the operation portion 16, the key signal input is detected through the key signal input terminals IK1 to IK4 and the codes corresponding to these keys are stored in the FKB region, while the logic one is written in the FLG3 region, whereby the key operation is stored.

The program then shifts to the step S119, where the content in the FLG3 region is determined. If and when the content in the FLG3 region is determined as the logic one representing that the key operation has been made, then the program shifts to the step S129. On the other hand, if and when the content in the FLG3 region is determined as the logic zero representing that no key operation has been made, then the program shifts to the step S120.

At the step S120 the content in the FLG1 region is determined. If and when the content in the FLG1 region is determined as the logic one, then the program proceeds to the step S122, whereas if the content in the FLG1 region is determined as the logic zero, then the program shifts to the step S121. At the step S121 the content in the FLG2 region is determined and, if and when the content in the FLG2 region is determined as the logic one, then the program shifts to the step S112, whereas if and when the content in the FLG2 region is determined as the logic zero, then the program shifts to the step S111.

Upon shifting from the step S120 to the step S122, the program thereafter proceeds through the steps S123 to S128 to the step S112. At the respective steps S122 to S126, the same task as that at the respective steps S106 to S110 is executed. At the step S127 the content in the TIME region is transferred to the DISPLAY region. The content in the TIME region is held even after the above described transfer. At the step S128 the logic one is written in the FLG2 region.

At the step S129 the content in the FKB region is determined and in the case where the content in the FKB region corresponds to the CLOCK FAST key, the program shifts to the step S133, whereas otherwise the program shifts to the step S130. Likewise, at the step S130, in the case where the content in the FKB region corresponds to the CLOCK SLOW key the program shifts to the step S137, whereas otherwise the program shifts to the step S131. Likewise, at the step S131 the content in the FKB region is determined and, if and when the content in the FKB region corresponds to the DEFROST key the program shifts to the step S135, whereas otherwise the program shifts to the step S132. Likewise, at the step S132 the content in the FKB region is determined and, in the case where the content in the FKB region corresponds to the START key the program shifts to the step S139, whereas otherwise the content is determined as corresponding to the CLEAR key and the program shifts to the step S102.

At the steps S133 and S137 the content in the CLOCK region is caused to vary at the speed higher than the normal speed. More specifically, since the content in the CLOCK region is the one minute unit at the least significant digit, normally renewal is made for every minute; however, at the step S133 the renewal is made at every 0.1 second and at the step S137 the renewal is made at every one second. At the steps S134 and S138 the logic zero is written in the FLG3 region and then the program shifts to the step S111.

At the step S135 the logic one is written in the FLG4 region and at the following step S136 the logic zero is written in the FLG3 region, whereupon the program then returns to the step S112.

At the step S139 the heat operation routine is executed. More specifically, in the heat operation routine the outputs are obtained at the heat command terminal OM and the output level command terminal OP of the microprocessor. At that time the output of the terminal OM is continuously obtained, whereas the output of the terminal OP is differently obtained depending on the content of the FLG4 region, i.e. the output of the terminal OP is continuously obtained if and when the content of the FLG4 region is the logic zero, whereas the output of the terminal OP is obtained with the 30% duty with one cycle being 10 seconds, as described previously, if and when the content of the FLG4 region is the logic one.

On the other hand, in the above described routine the content in the TIME region is subtracted for every second and the content thereof is displayed by the display 15 as a timer left period. If and when the content in the TIME region becomes zero, the respective outputs at the terminals OM and OP disappear, whereupon the output is obtained for one second at the buzzer command terminal OB. The program then shifts to the step S102.

If and when the door 14 of the microwave oven (FIG. 1) is opened during the execution of the above described routine, the microprocessor interrupts the execution of the routine responsive to the signal obtained at the input terminal IC1. The interrupted state is released when the door 14 is thereafter closed and the START key is operated again. If and when the CLEAR key is operated during the execution of the above described routine, the program shifts to the step S102.

Now an operation of the microwave oven responsive to the manual operation of the operation portion 16 will be described in the following.

Upon initiation of a power supply to the microwave oven, the program proceeds through the steps S101 to S114 to the step S115. At that time the timer period loaded at the steps S104 and S113 remains the same unless the timer operation knob 19 is moved and the program proceeds after the step S115 through the steps S116 and S118 to the step S119. Now assuming that no key operation has been made by the operation portion 16, the program proceeds from the step 119 through the steps S120 and S121 to return to the step S111, whereupon the program circulates through the steps S111 to S116 and S118 to S121. During such circulation of the steps the content in the CLOCK region is transferred at the step S111 to the DISPLAY region and is displayed at the step S118 by the display 15. The display is a current time display; however, since the current time setting has not been made, the displayed current time is not correct.

For the purpose of setting the current time, the CLOCK FAST key or the CLOCK SLOW key is depressed and then the key operation is detected at the step S119 during the above described circulation. The program proceeds from the step S119 through the step S129 or steps S129 and S130 to the step S133 or S137 and further returns through the step S134 or S138 to the step S111. Accordingly insofar as the above described CLOCK FAST key or the CLOCK SLOW key is kept depressed, the program makes circulation of the respective steps S111 to S116, S118, S119, S129, and S133, S134 (or the steps S129 and S130, 137 and S138), while the displayed current time in the display 15 quickly changes during that time period. At the time when the correct current time is reached in the display, the above described key is released from depression, whereupon the program again makes circulation of the respective steps S111 to S116 and S118 to S121. As a result, thereafter the correct current time is displayed by the display 15. Such state is referred to as a standby state.

Now in the case where a heat cooking operation is to be performed for twenty-five minutes, first the timer operation knob 19 of the operation portion 16 is adjusted to the graduation position of twenty-five minutes. A situation where the timer operation knob 19 has already been brought to the graduation position of twenty-five minutes from the beginning may be considered; however, only for the purpose of description, it is assumed that the knob 19 has been brought to the position other than twenty-five minutes at the beginning and in performing the above described heat cooking operation the knob 19 is adjusted to the position of twenty-five minutes.

Such displacement of the timer operation knob 19 is detected at the step S115 of the above described standby state and the program then proceeds through the steps S117 to S120 and S122 to S128. More specifically, the new timer period information of "25 minutes" is stored in the TIME region at the step S124 and is transferred at the step S127 to the DISPLAY region. The program then proceeds through the respective steps S112 to S114 to the step S115; however, the timer operation knob 19 now remains at the position of twenty-five minutes. Accordingly, the program shifts from the step S115 to the step S116 and then returns through the steps S118 to S121 to the step S112, whereupon the program makes circulation of the respective steps S112 to S116 and S118 to S121. During such operation the timer period information of "25 minutes" is displayed by the display 15.

Meanwhile, if and when the timer operation knob 19 is further moved to another position, then the timer period information corresponding to the new position is displayed in the same manner, as readily understood.

When the START key of the operation portion 16 is operated in such situation, such key operation is detected at the step S119 and the prowhere the heat operation routine is executed. More specifically, in the above described heat operation routine the magnetron 105 (FIG. 6) is caused to make oscillation for twenty-five minutes, during which time period the timer left period changing from time to time is displayed by the display 15. Upon completion of the heat operation, the buzzer 207 is energized, whereupon the program returns to the above described standby state and again the current time is displayed by the display 15.

Meanwhile, on the occasion of a defrost operation, the DEFROST key is operated before the operation of the above described START key.

As is apparent from the above described progress of the program, the timer time information corresponding to the position of the timer operation knob 19 is loaded in the above described standby state, although the information is not displayed, so that even the START key can be operated immediately in the standby state and such operation can be advantageously used in performing repetitively the cooking operation for the same cooking time period, for example.

Figure 12:
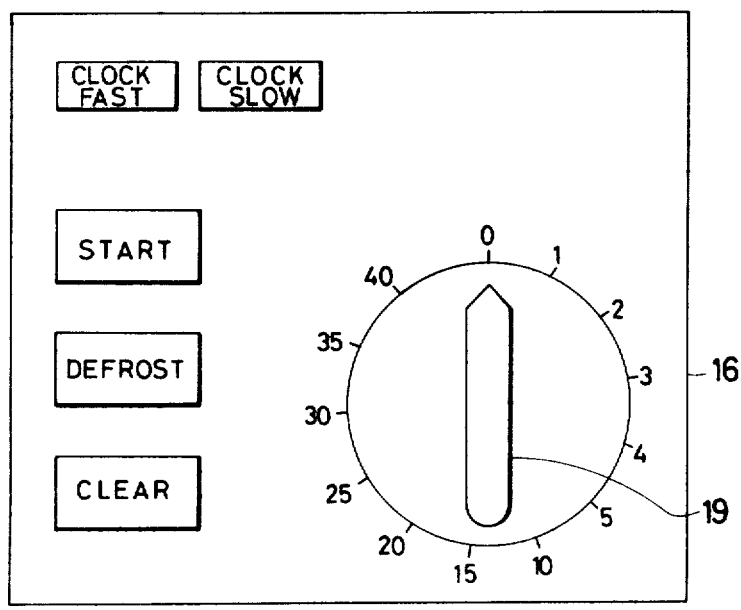
FIG. 12 is a diagram showing one example of the operation portion of the above described embodiment.

Now referring to the flow diagram shown in FIGS. 10A and 10B and simultaneously referring to FIGS. 11 and 12, another embodiment of the present invention will be described. In the embodiment shown, the above described timer operation knob 19 (FIG. 3) is adapted such that the displacement range is sectioned into at least two sections, so that the time period for the unit displacement amount (i.e. the minor graduation) of the knob 19 may be different for each of the above described sections. In the embodiment shown the graduation formed along the rotational path of the timer operation knob 19 of the operation portion 16 is formed as shown in FIG. 12. More specifically, in the embodiment shown the above described graduation is formed with a relatively wide equispacing from the origin position up to five minutes and with a relatively narrow equispacing therefrom up to forty minutes.

In operation, upon turning on of a power supply, the program starts execution of the step S201 automatically responsive to the input signal obtained at the terminal RESET of the microprocessor.

Figure 9A:
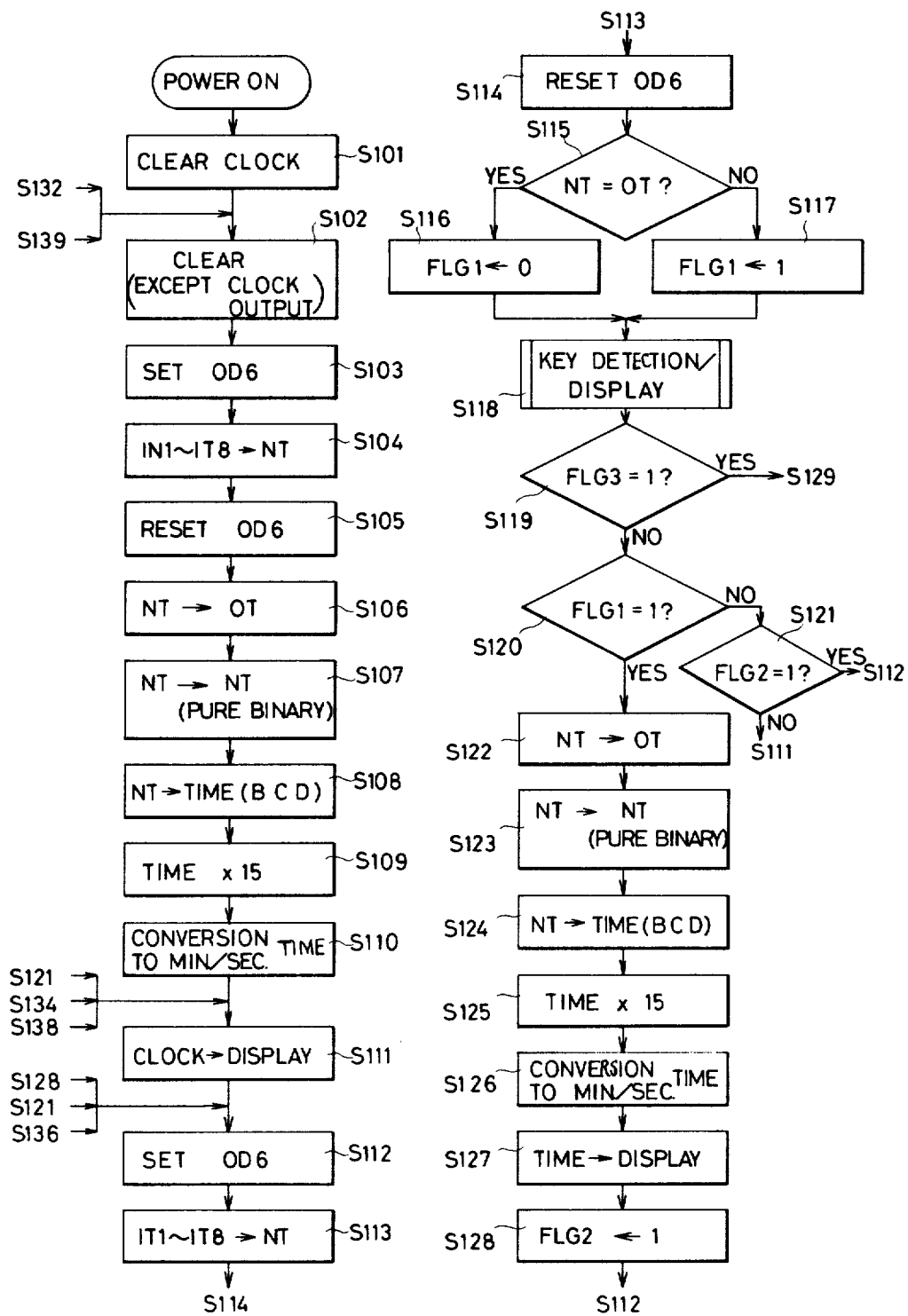

Then program proceeds to the steps S202 to S207; however, these steps S202 to S207 are the same as those steps S102 to S107 depicted with reference to FIG. 9A and hence a more detailed description will be omitted.

At the step S208 it is determined whether or not the content in the NT region is larger than "00100110" and, if it is determined that the content is larger, the program shifts to the step S211, whereas if the content is smaller the program shifts to the step S209. Meanwhile the above described and subsequently described code signals are different from those in the previous table in that the leftmost indicates the least significant digit. The above described value "00100110" represented by the binary notation of eight bits represents "100" in terms of the decimal notation and accordingly the same corresponds to the 100th position of the brush 24' of the signal generator 20. This means that at the step S208 it is determined whether the timer setting was made to exceed the position representing five minutes in the time graduation on the periphery of the timer operation knob 19.

At the step S209 the content in the NT region is converted from the binary code of eight bits to the binary coded decimal code of four digits, whereupon the same is transferred to the TIME region. Such code conversion is made in accordance with the well-known manner. The numerical value entered in the TIME region at the step S209 corresponds to the displacement amount displaced from the origin point of the timer operation knob 19. Since the unit displacement amount corresponds to three seconds, at the following step S210 the content in the TIME region is multiplied by three. More specifically, the content in the TIME region becomes that representing the timer period corresponding to the position of the timer operation knob 19 in terms of the second unit. For example, assuming that the operation knob 19 is at the position of three minutes fifteen seconds, the content in the TIME region becomes "0195". At the following step S213 the content in the TIME region represented in terms of the second unit is converted into the minute and second unit. More specifically, in the above described example, "0195" is converted into "0315". The program then shifts to the step S214.

At the step S211 the same task as that at the step S209 is executed. The numerical value entered in the TIME region at the step S211 corresponds to the displacement amount displaced from the origin point of the timer operation knob 19; however, the total displacement amount from the origin point up to the position representing five minutes corresponds to 300 seconds and the unit displacement amount exceeding the position representing five minutes corresponds to 15 seconds and therefore the content in the TIME region is corrected at the following steps S212 in the following manner:

(content in the TIME region − 100) × 15 + 300

More specifically, through the above described correction the content in the TIME region becomes that representing the timer period corresponding to the position of the timer operation knob 19 in terms of the second unit and accordingly the above described content is converted at the following step S213 to the minute and second units.

At the step S214 the content in the CLOCK region is transferred to the DISPLAY region. The content in the CLOCK region is held even after the above described transfer.

The program then proceeds through the respective steps S215 to S217 to the step S218. At the respective steps S215, S216 and S217 the same task as that at the respective steps S203, S204 and S205 is executed.

At the step S218 the contents in the NT region and the OT region are compared and, if both are the same, the program shifts to the step S219, whereas if both are not the same, the program shifts through the step S220 to the step S221. At the respective steps S219 and S220 the logics zero and one are loaded in the FLG1 region, respectively.

At the step S221 a display is made by the display 15 and the key operation by the operation portion 16 is detected. More specifically, at the step S221 the outputs are obtained in succession at the input/output control terminals ODG1 to ODG5 and the contents in the respective digits of the DISPLAY region undergo code conversion in synchronism with the outputs at these terminals ODG1 to ODG4, whereby the outputs are obtained from the display output terminals ODS1 to ODS7. At that time unnecessary zeros in the more significant digits are supressed from being displayed. The content in the FLG2 region is determined and if the content is determined as the logic zero the output is obtained at the terminal OSD7 in synchronism with the output of the control terminal ODG5 for the purpose of displaying the current time, whereby a colon display is made by the display 15. On the other hand, in the case where the key operation is made by the operation portion 16, the same is detected through the key signal input terminals IK1 to IK4 and the code corresponding to the key is stored in the FKB region, while the logic one is loaded in the FLG3 region, whereby the fact of key operation is stored.

The program then shifts to the step S220 and at the step S220 the content in the FLG 3 region is determined. If the content is determined as the logic one at the step, this means that the key operation has been made and the program shifts to the step S233. On the other hand, if the content is determined as the logic zero, then this means that the key operation has not been made and the program shifts to the step S223.

At the step S223 the content in the FLG1 region is determined and if the content is determined as the logic one the program shifts to the step S225, whereas if the content is determined as the logic zero the progam shifts to the step S224. At the step S224 the content in the FLG2 region is determined and, if the content is determined as the logic one the program shifts to the step S215, whereas if the content is determined as the logic zero the program shifts to the step S214.

Upon shifting from the step S223 to the step S225, the program then proceeds through the steps S226 to S229, S232 to S234 (or the steps S226, S227, S230 to S234) to the step S215. At the steps S225 to S229, S232 (or the steps S225 to S227, S230 to S232), the same task as that in the respective steps S206 to S210, S213 (or the steps S206 to S208, S211 to S213) is executed. At the step S233 the content in the TIME region is transferred to the DISPLAY region. The content in the TIME region is held even after the above described transfer. At the step S234 the logic one is loaded in the FLG2 region.

Thereafter the operation is controlled in accordance with the program shown in FIG. 9B depending on the content in the FKB region, i.e. the kind of the function key operated at that time.

Now an operation of the microwave oven in accordance with a manual operation by the operation portion 16 will be described in the following.

Upon initiation of a power supply to the microwave oven, the program proceeds through the steps S201 to S207 to the step S208 and further proceeds through the steps S209 and S210 (or the steps S211 and S212) to the step S213 and further to the steps S218. The timer time period loaded at the steps S204 and S216 remains the same unless the timer operation knob 19 is operated and therefore the program proceeds after the step S218 through the steps S219 and S221 to the step S222. Now assuming that no key operation is made by the operation portion 16, the program returns from the step S222 through the steps S223 and S224 to the step S214, whereupon the program makes circulation of the steps S214 to S219 and S221 to S224. During such circulation process, the content in the CLOCK region is transferred to the DISPLAY region at the step S214 and the same is displayed by the display 15 at the step S221. Although the display is directed to a current time display, the current time as displayed is incorrect, inasmuch as the current time setting has not been made.

For the purpose of setting the current time, the CLOCK FAST key or the CLOCK SLOW key is depressed, when the key operation is detected at the step S222 of the above described circulation process. Thereafter the program proceeds from the step S222 through the step S129 or the steps S129 and S130 to the step step S133 or S137. The program further proceeds through the step S134 or S138 to the step S214. Accordingly, insofar as the above described CLOCK FAST key or the CLOCK SLOW key is kept depressed, the program makes circulation of the steps S214 to S219, S221, S222, 129, S133 and S134 (or the steps S129, S130, S137 and S138), while the current time display by the display 15 quickly changes. If and when the current time as displayed reaches a correct current time display, the above described key is released from being depressed, whereupon the program makes again circulation of the steps S214 to S219 and S221 to S224, while the display 15 makes display of the correct current time. Such state is a standby state.

Now consider a case where a heat cooking operation of four minutes thirty seconds is performed. In such a case, first the timer operation knob 19 of the operation portion 16 is adjusted to the position of four minutes thirty seconds. Although a situation may be considered where the timer operation knob 19 has already been set to the position of four minutes thirty seconds from the beginning, for the purpose of description of the operation, it is assumed that the timer operation knob 19 has been originally set to the other position and the knob 19 is adjusted to the position of four minutes thirty seconds in starting the above described heat cooking operation.

Such displacement of the timer operation knob 19 is detected at the step S218 of the above described standby state and the program then proceeds through the steps S220 to S223, S225 to S229, S232 to S234 (or the steps S220 to S223, S225 to S227, S230 to S234). More specifically, the new timer time period information of "four minutes thirty seconds" is loaded in the TIME region at the step S232 and the same is transferred to the DISPLAY region at the step S233. The program then shifts through the respective steps S215 to S217 to the step S218; however, since the timer operation knob 19 has been set to the position of four minutes thirty seconds, the program proceeds from the step S218 to the step S219. Thereafter the program proceeds through the steps S221 to S224 to the step S215, whereupon the program makes circulation of the respective steps S215 to S219 and S221 to S224, while the timer time period information of "four minutes thirty seconds" is displayed at the step S221.

Meanwhile, if the timer operation knob 19 is further adjusted to a different position, the timer time period information corresponding to the position is similarly displayed, as is readily understood.

A point fully noted is that since the time graduation from zero to five minutes has been enlarged as compared with the time graduation from five minutes to forty minutes it is of extreme ease to set a timer time period by means of the timer operation knob 19. Although the timer time period from five minutes to forty minutes has been indicated in a reduced graduation, usually a timer time period being set in that range is large as compared with the enlarged range for zero to five minutes and a relative setting error by operating the knob does not entail so much a problem as a matter of practice.

More specifically, as described in the foregoing, the embodiment in discussion is structured to comprise both a graduation of an enlarged pitch and a graduation of a reduced pitch, whereby both a short time period timer and a long time period timer have been implemented in one timer apparatus.

Meanwhile, although in the above described embodiment the range up to five minutes was included in a range of an enlarged-pitch, such range may be expanded to a longer time period as necessary. The above described embodiment was further adapted such that the graduation pitch is made different based on whether the input value is larger or smaller than a predetermined time period criterion; however, alternatively the embodiment may be adapted such that the signal generator 20 per se is structured to generate also a range code corresponding to the ranges of the graduation, so that graduation pitch may be discriminated by such range code.

For example, the conductive pattern 26 shown in FIG. 5A may be modified so that the outputs from the first to sixth signal terminals 28a to 28f may be used as the data (time period information) code, while the outputs from the seventh and eighth signal terminals 28g 28h may be the range code. FIG. 11 shows a bit pattern of such codes. More specifically, the full range from the above described first position to the 240th position is divided into the ranges I to IV each covering 60 positions and the above described data code for the respective ranges is represented by the Gray code of six bits or the first to 60th positions while the above described range code is represented by a 2-bit pattern. The time period graduation along the periphery of the timer operation knob 19 is allotted such that the 60th position in the range I corresponds to five minutes, the 60th position of the range II corresponds to 15 minutes, the 60th position of the range III corresponds to 30 minutes and the 60th position of the range IV corresponds to 60 minutes. Accordingly, the above described unit displacement amount of the timer operation knob 19 changes 5 seconds, 10 seconds, 15 seconds and 30 seconds for the ranges I, II, III and IV, respectively. The internal processing by the microprocessor with respect to such code signals of the signal generator 20 is performed in the following manner. More specifically, the content in the more significant two bits in the NT region (i.e. the outputs at the seventh and eighth signal terminals 28g and 28h) is first determined at the portion corresponding to the respective steps S207 to S212 and S226 to S231 of the above described program, whereby it is determined in what range the same falls. Then the code of 6 bits represented by the Gray code in the NT region is converted into a binary number and the converted binary number is then converted into a binary decimal coded code of 4 bits, whereupon the same is transferred to the TIME region. Then the content in the TIME region is corrected in the following manner depending on the content of the region as determined:

In the range I, the content in the TIME region is multiplied by 5,

In the range II, 300+the content in the TIME region multiplied by 10,

In the range III, 900+the content in the TIME region multiplied by 15, and

In the range IV, 1800+the content in the TIME region multiplied by 30.

When the START key of the operation portion 16 is operated, such key operation is detected at the step S222 and the program shifts from the step S222 through the steps S129 to S132 to the step S139, where the heat operation routine is executed. More specifically, the magnetron 105 (FIG. 6) is caused to make oscillation for 4 minutes 30 seconds, while a timer left time period changing from time to time is displayed by the display 15. Upon completion of the heat operation, the buzzer 207 is energized, whereupon the program returns to the above described standby state, when the current time is displayed again by the display 15.

Figure 13:
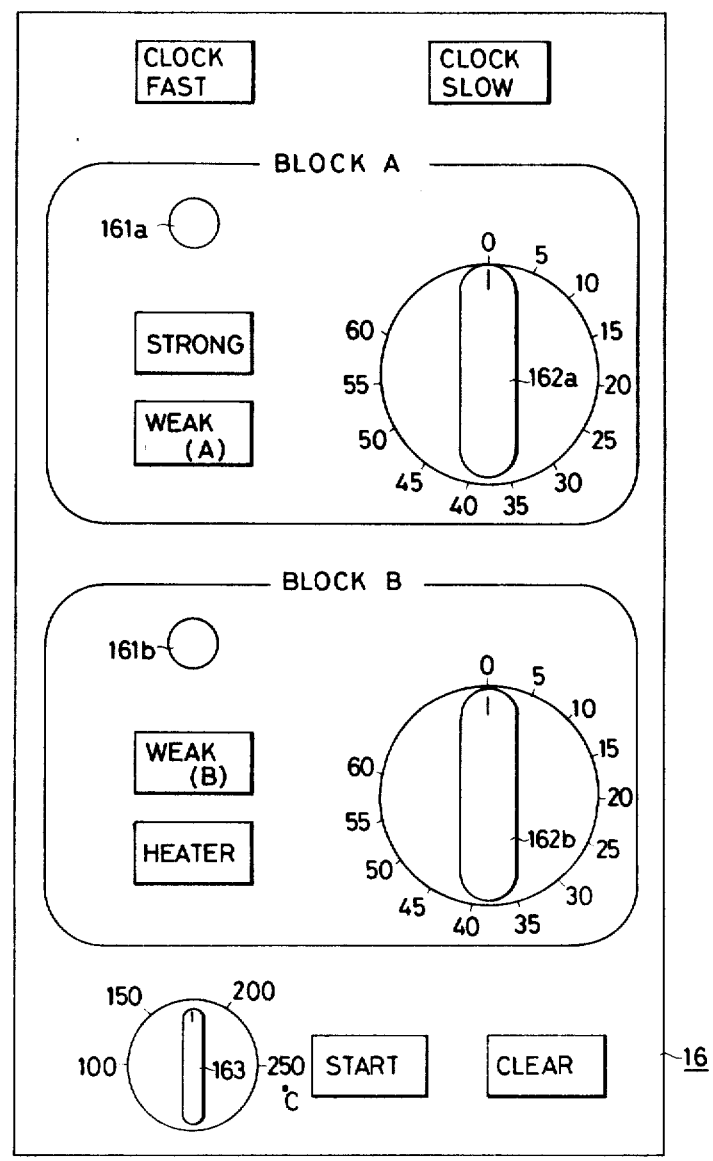
FIG. 13 is a view showing an operation portion for explaining another preferred embodiment of the present invention.

FIG. 13 is a view showing an operation portion 16 of a microwave oven in accordance with a further embodiment of the present invention. The operation portion 16 comprises a MICROWAVE STRONG key and a MICROWAVE WEAK (A) key, a display lamp 161a, and timer operation knob 162a in the region in a circle indicated as "BLOCK A". The operation portion 16 further comprises a MICROWAVE WEAK (B) and a HEATHER key, a display lamp 161b and a timer operation knob 162b in the region in a circle indicated as "BLOCK B". The operation portion 16 further comprises a CLOCK FAST key, a CLOCK SLOW key, a START key, a CLEAR key, and a temperature adjustment knob 163 disposed outside the above described circles. The above described keys may each comprise an ordinary contact type push button switch. The temperature adjustment knob 163 is provided rotatably on the control panel 13 (FIG. 1), while the temperature graduations (C°) for "100", "150", "200", and "250" are indicated on the operation portion 16 along the periphery of the knob 163. A variable resistor, to be described subsequently, is provided on the rear of the control panel 13 so as to be rotated by the above described knob 163. The timer operation knobs 162a and 162b are also provided so as to be rotatable, while graduations for indicating the position "0" and the intervals for five minutes are indicated along the periphery of the knobs. Although not shown, the timer operation knobs 162a and 162b are operatively coupled to signal generators 20a and 20b (FIG. 14), which may be structured as previously described in conjunction with FIG. 4.

Figure 14:
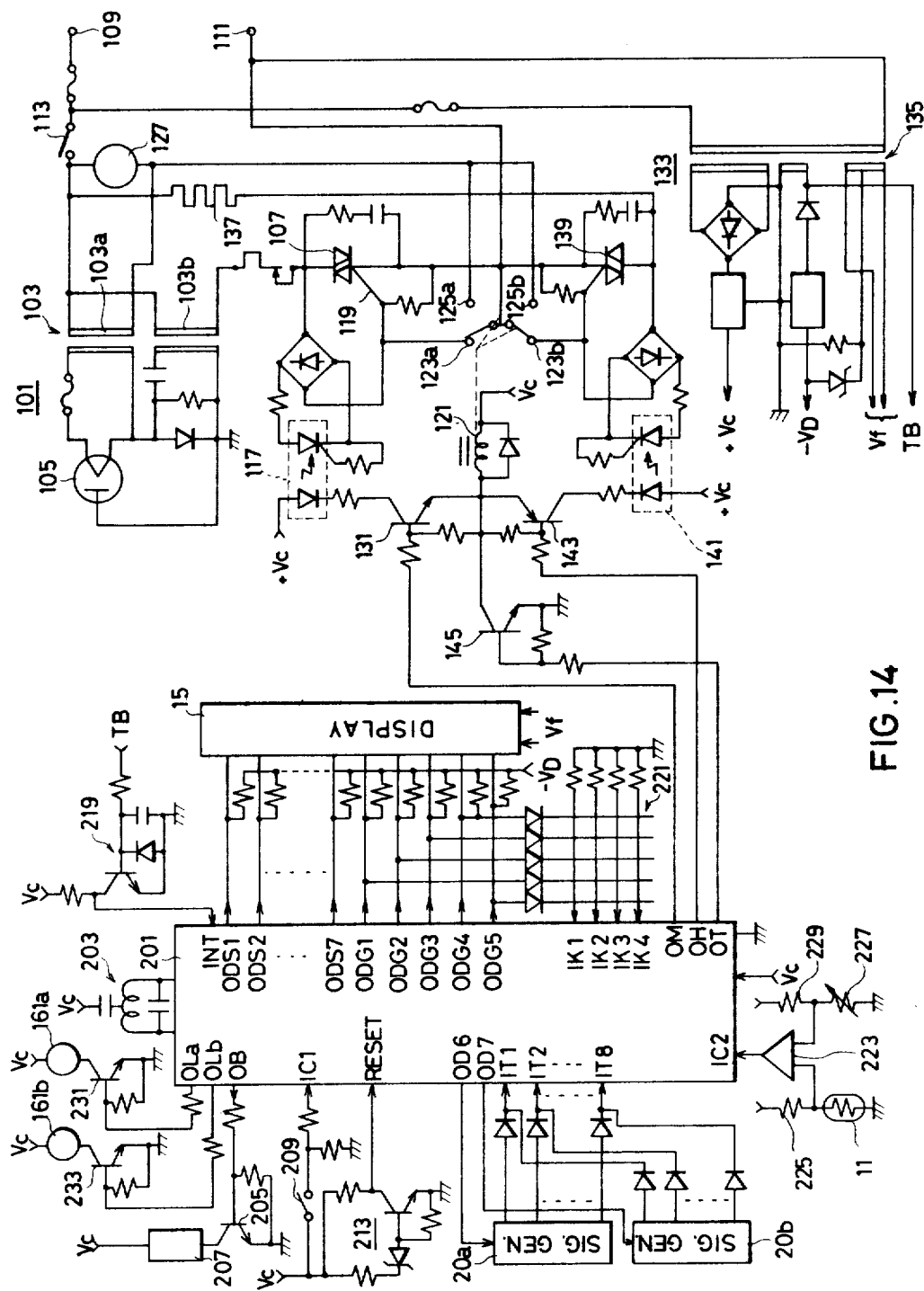
FIG. 14 is a schematic diagram of the above described embodiment.
Figure 15A:
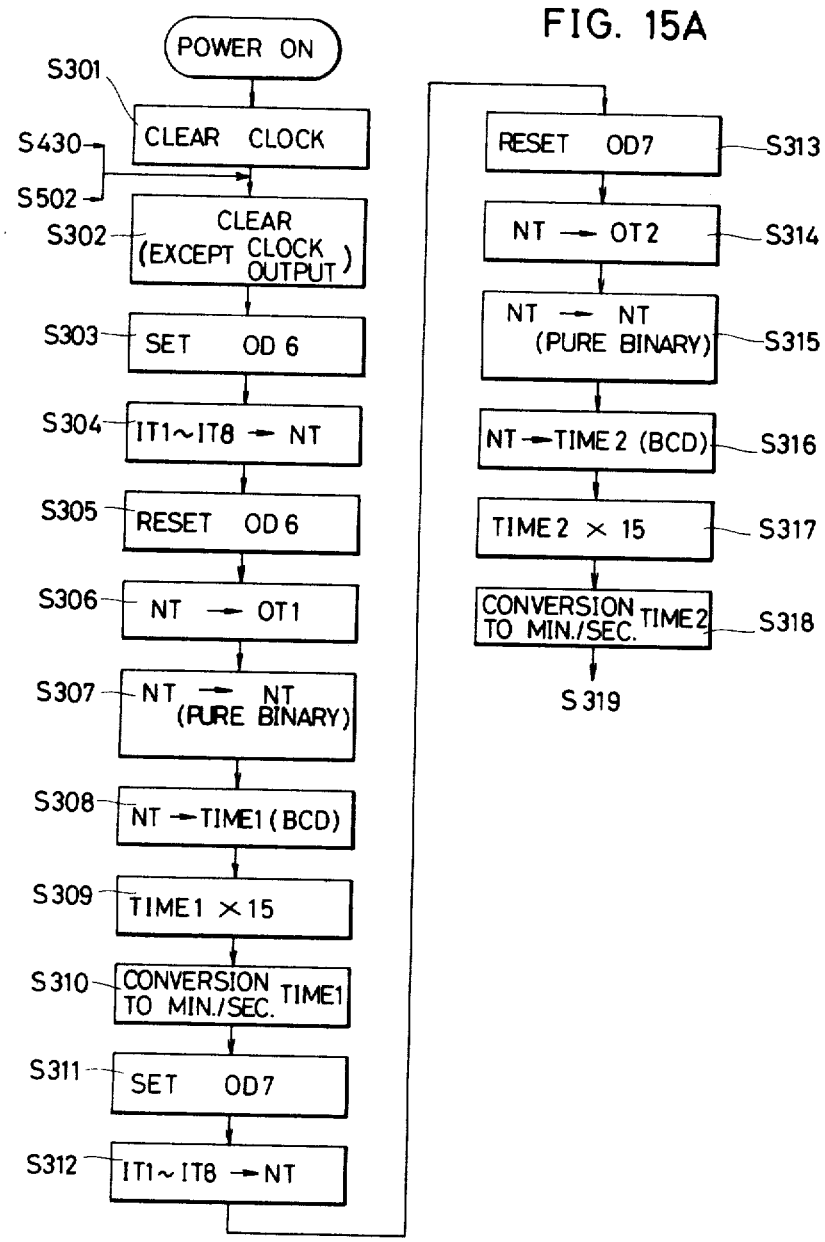
Figure 15B:
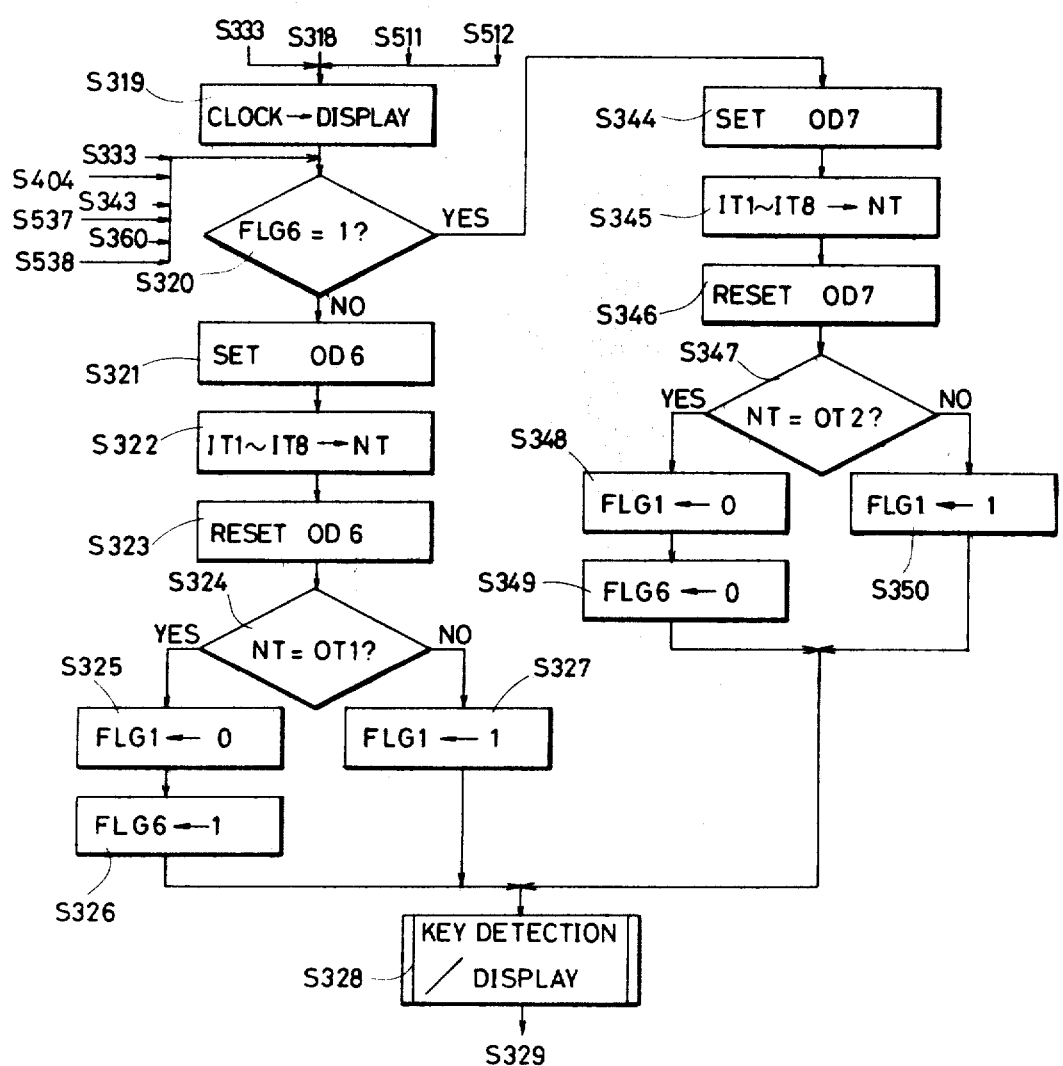
Figure 15C:
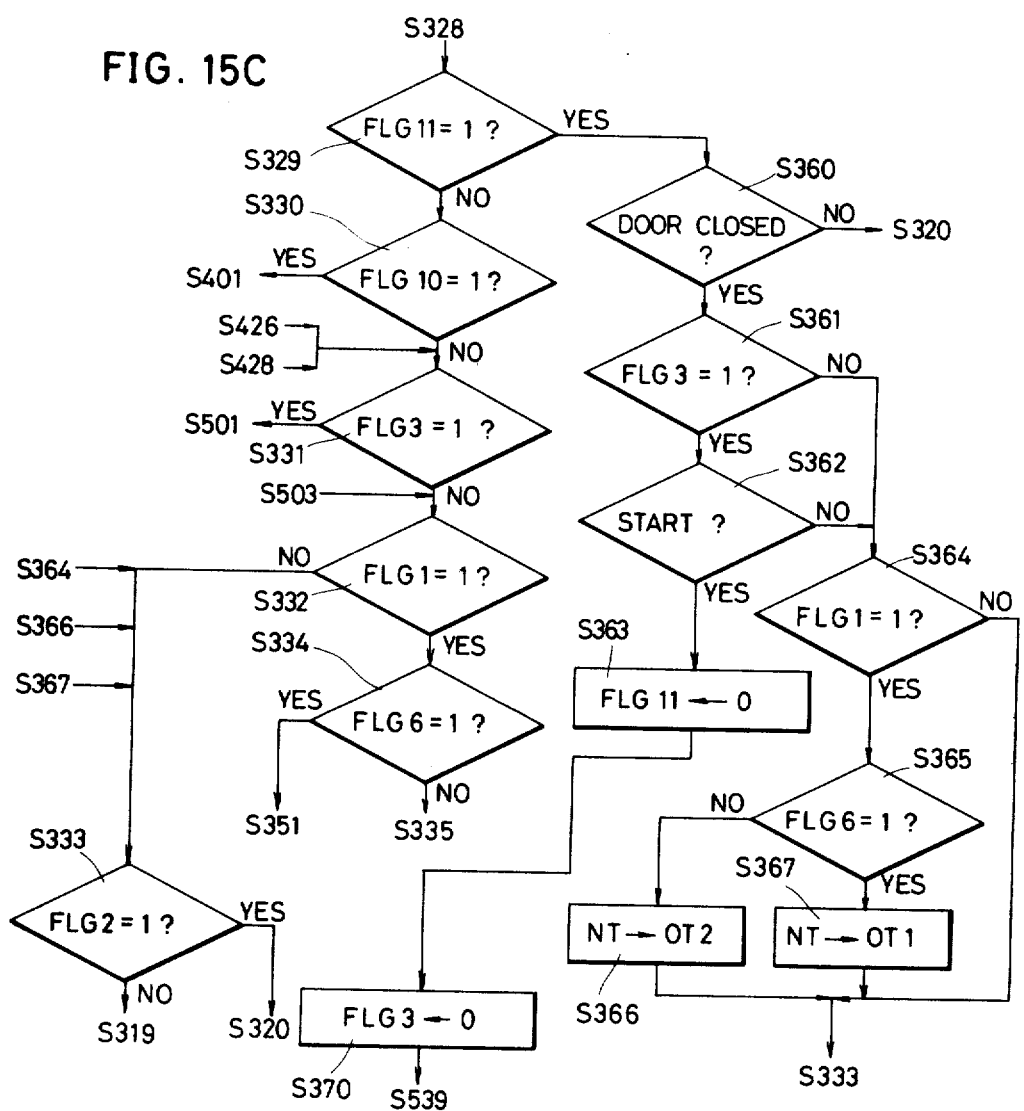
Figure 15E:
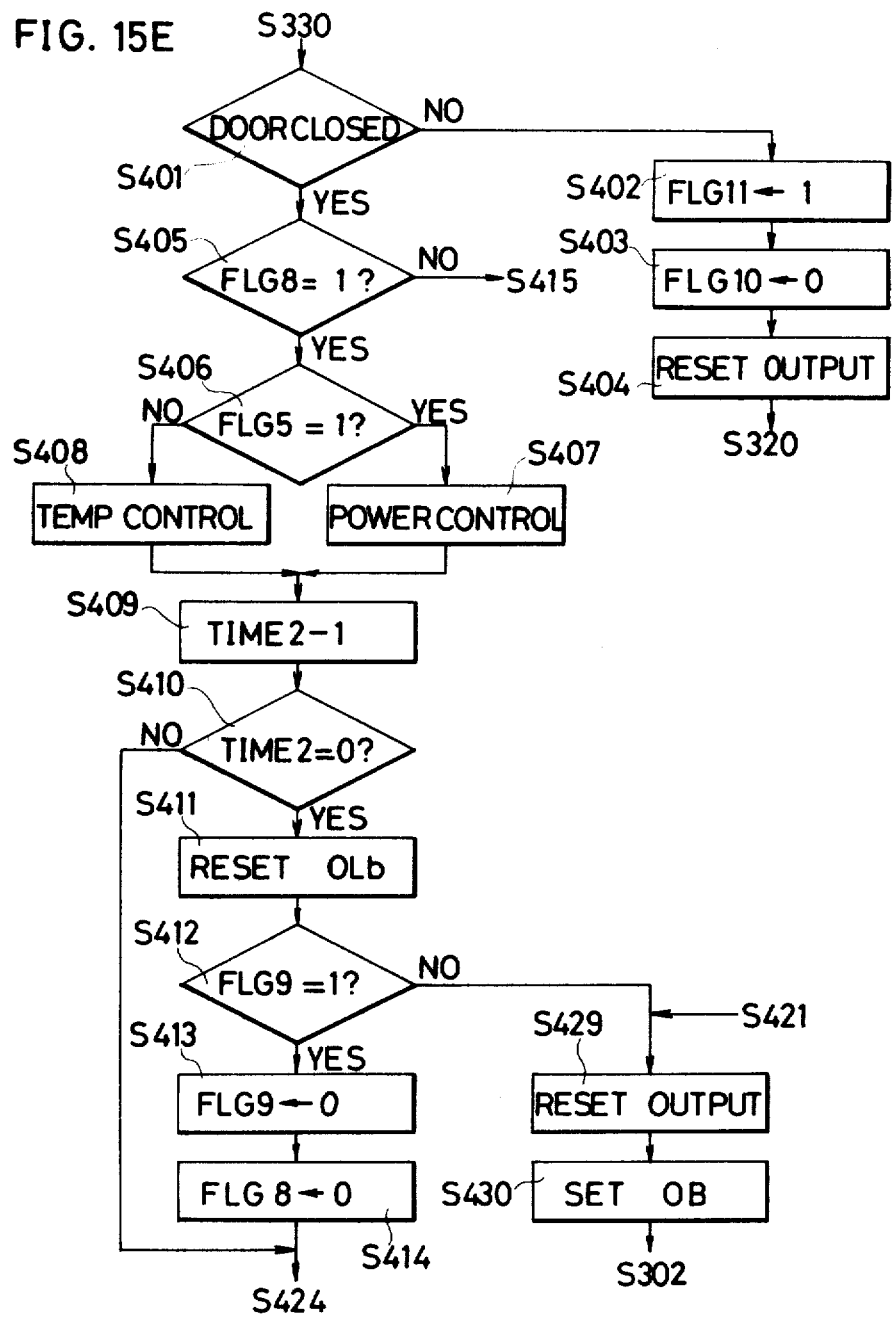
Figure 15H:
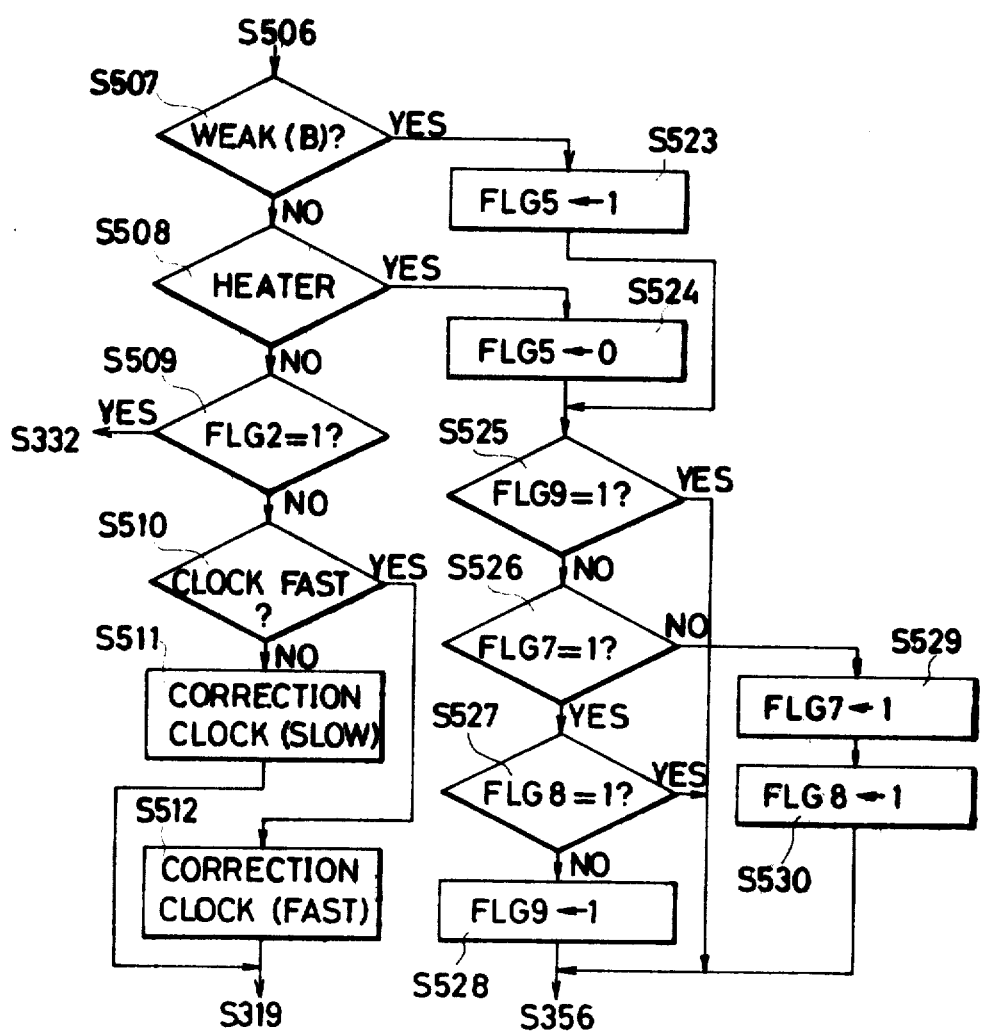

FIG. 14 is a schematic diagram of the embodiment in discussion. It is pointed out that the embodiment is structured to achieve a heat operation by a microwave oven and also to achieve a heat operation by a heater. To that end, the embodiment comprises a bidirectional thyristor 139 which is similar to the bidirectional thyristor 107. The bidirectional thyristor 139 is used to control a power supply to a heater 137. A transistor 143, a photocoupler 141 and so on are provided in association with the bidirectional thyristor 139, as is similar to the bidirectional thyristor 107. The heater 137 is connected through an interlock switch 113 and the bidirectional thyristor 139 to the power supply terminals 109 and 111. The heater 137 is mounted on the upper wall of the cooking chamber 12 (FIG. 1), so that when the same is energized, the same is energized, the same is red heated, whereby the heating energy is applied to a material being cooked. If and when the transistors 145 and 143 are both rendered conductive, a signal is applied from the photocoupler 141 to the gate electrode of the bidirectional thyristor 139, whereby the heater 137 is supplied with an electric power. The thyristor 107 is rendered conductive responsive to a signal from a photocoupler 117, when the transistors 145 and 131 are both rendered conductive, whereby the magnetron 105 is energized to generate a microwave. The relay 121 is energized when the transistors 145 is rendered conductive, whereby two normally open contacts 125a and 125b are closed while two normally closed contacts 123a and 123b are opened. Accordingly, upon energization of the relay 121, the blower motor 127 is energized and the current flows through the high voltage input winding 103a of the high voltage transformer 103. As a result, the cathode of the magnetron 105 is supplied with a current. The above described transistors 131, 143 and 145 are controlled to be conductive or non-conductive responsive to the outputs obtained at the output terminals OM, OH and OT of the microprocessor 201.

The embodiment shown is further structured such that the input terminals IT1 to IT8 of the microprocessor 201 commonly receive the outputs of 8 bits obtained from two signal generators 20a and 20b. The microprocessor 201 comprises an output terminal OD6 for providing a pulse signal to the signal generator 20a and an output terminal OD7 for providing a pulse signal to the other signal generator 20b. The microprocessor 201 further comprises two output terminals OLa and OLb. The output terminals OLa and OLb are used to indicate which one the display by the display 15 is related to, "BLOCK A" or "BLOCK B" in FIG. 13. More specifically, the output terminal OLa is connected to the base electrode of the transistor 231 for driving the display lamp 161a and the output terminal OLb is connected to the base electrode of the transistor 233 for driving the display lamp 161b. Accordingly, in the presence of the output from the output terminal OLa the display lamp 161a is lighted, whereby an indication is made to an operator that a display by the display 15 is related to the set time period by the timer operation knob 162a provided in the circle "BLOCK A". Similarly, the output is obtained from the output terminal OLb, when the display by the display portion 15 is related to the set time period by the time operation knob 162b provided in the circle "BLOCK B".

The microprocessor 201 further comprises an input terminal IC2. The input terminal IC2 is allotted for a temperature detection input terminal on the occasion of a temperature operation. The input terminal IC2 is connected to receive the output of the comparator 223. One input of the comparator 223 is connected to receive a voltage from the junction of a thermistor 11 provided operatively coupled to the cooking chamber 12 and the resistor 225. The other input of the comparator 223 is connected to receive a voltage from the junction of a variable resistor 227 and a resistor 229. The thermistor 11 may be provided on the outside of the upper wall of the cooking chamber 12, as shown by the dotted line in FIG. 1. Alternatively, the thermistor 11 may be provided in the vicinity of an exhaust port, not shown, so that the temperature of the exhaust from the cooking chamber may be detected. The variable resistor 227 is provided so as to be rotated by the temperature adjustment knob 163 depicted in conjunction with FIG. 13, so that a resistance value thereof may be changed as a function of the rotation of the knob 163. The comparator 223 provides an output when the terminal voltage from the thermistor 11 exceeds the terminal voltage of the variable resistor 227 and the output of the comparator 223 is applied to the input terminal IC2. More specifically, the comparator 223 provides the output to the input terminal IC2, if and when the temperature in the cooking chamber detected by the thermistor 11 exceeds a temperature preset by the temperature adjustment knob 163.

Figure 8:
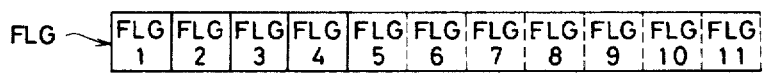
FIG. 8 is a view showing the storing regions of a random access memory.

The microprocessor 201 of the embodiment shown may be structured in the same manner as that depicted in conjunction with FIG. 7. FIG. 7 shows by the dotted line the input terminal and the output terminal provided in addition to the FIG. 6 embodiment. The storing regions of the random access memory 201c may also be structured in the same manner as described previously; however, the embodiment shown further comprises additional storing regions in addition to the previously described embodiment. More specifically, the random access memory 201c of the embodiment shown comprises the DISPLAY region, the CLOCK region, the TIME1 region and the TIME2 region each of the 4-digit length, as shown in FIG. 8. The random access memory 201c further comprises the NT region, OT1 region and the OT2 region each of the 2-digit length. In the embodiment shown the FLG region is expanded to comprise the regions FLG1 to FLG11 each of one bit. The TIME1 region and the TIME2 region are used to store timer time periods associated with the timer operation knobs 162a and 162b, respectively. These regions of the 4-digit length are used as output buffers to the display 15. The FLG1 region serves to indicate whether there occurs a change in the position of the timer operation knob 162a or 162b. The FLG2 region serves to indicate whether a current time display has been made by the display 15. The FLG3 region serves to indicate whether any key operation has been made in the operation portion 16. The FLG4 region serves to indicate whether any one of the "MICROWAVE STRONG" key and the "MICROWAVE WEAK(A)" key has been operated. The FLG5 region serves to indicate whether any one of the "MICROWAVE WEAK(B)" key and "HEATER" key has been operated. The FLG6 region serves to indicate which one of the timer operation knobs 162a and 162b the timer time period as loaded is. The FLG7 region serves to indicate which one of the keys in the "BLOCK A" and the "BLOCK B" of the operation portion 16 has been operated. The FLG8 region serves to indicate which block key of the "BLOCK A" and "BLOCK B" has been previously operated. The FLG9 region serves to indicate whether any one of the keys in the circles "BLOCK A" and "BLOCK B" has been operated. The FLG10 region serves to indicate whether a heat operation has been performed by means of the magnetron 105 or the heater 137. The FLG11 region serves to indicate whether door 14 (FIG. 1) has been opened in the course of the heat operation.

Now that the structural features of the embodiment shown were described in the foregoing, an operation of the embodiment shown will be described with reference to the numbers. In principle, the program proceeds from the block of a smaller step number to a block of a larger step number in the order of arrangement of the respective blocks, except that the program suitably returns to the previous step on the occasion of the return or depending on the decision by the respective determining steps.

Generally out of the steps shown by the rectangle blocks, the steps as indicated as "FLGn→0" and "FLGn→1" (where n=1 to 11) show that the logics zero and one are loaded in the FLGn regions, and out of the steps indicated in the rhombus blocks, the steps indicated as "FLGn=1?" (where n=1 to 11) show that the content in the FLGn region is determined and the content is determined as YES when the same is the logic one whereas the same is determined as NO when the same is the logic zero.

Now in the following the remaining steps will be described.

Step S301: The step is automatically executed responsive to the input signal to the terminal RESET of the microprocessor on the occasion of turning on of a power supply to the microwave oven and the clock associated region including the CLOCK region of the random access memory is cleared.

Step S302: All the output terminal signals of the microprocessor and all the other regions of the random access memory excluding the above described clock associated regions are cleared.

Steps S303 and S321: The output is obtained from the output terminal OD6 of the microprocessor and accordingly the signal of 8 bits is obtained from the signal generator 20a depending on the position of the timer operation knob 162a at that time and is applied to the input terminal IT1 to IT8 of the microprocessor.

Steps S304, S312, S322 and S345: The signals being applied to the input terminals IT1 to IT8 of the microprocessor are as such stored in the NT region.

Steps S305 and S323: The output of the output terminal OD6 of the microprocessor is reset to disappear.

Steps S306, S335 and S367: The content in the NT region is transferred to the OT1 region, while the content in the NT region is held even after the above described transfer.

Steps S307, S315, S336 and S352: The content in the NT region undergoes code conversion, whereby the original Gray code of 8-bits is converted into a binary code of 8-bits, such code conversion being performed in the same manner as described in conjunction with the previous embodiments.

Steps S308 and S337: The content in the NT region is converted from the binary code further to the binary coded decimal code of 4 digits, whereupon the code is stored in the TIME1 region, such conversion being performed through a well-knumber of the unit minor graduation (FIG. 5A) counted from the origin point of the timer operation knob 162a. Since the unit minor graduation corresponds to 15 seconds, the content in the TIME1 region is multiplied by 15 at the following steps S309 and S338. As a result, the content in the TIME1 region becomes a value of a timer time period indicated in terms of seconds and corresponding to the position of the timer operation knob 162a. For example, assuming that the operation knob 162a is at the position of five minutes thirty seconds, the content in the TIME1 region becomes "0330".

Steps S310 and S339: The content in the TIME1 region represented in terms of seconds at the previous steps S309 and S338 is converted to the value in terms of the minute and second unit. More specifically, in the case of the above described example, "0330" is converted into "0530".

Steps S311 and S344: The output is obtained at the output terminal OD7 of the microprocessor. Accordingly, the signal of 8-bits according to the position of the timer operation knob 162b is obtained from the signal generator 20b and is applied to the input terminal IT1 to IT8 of the microprocessor.

Steps S313 and S346: The output of the output terminal OD7 of the microprocessor is reset to disappear.

Steps S314, S351 and S366: The content in the NT region is transferred to the OT2 region. The content in the NT region is held even after the above described transfer.

Steps S316 and S353: As in the case of the previous steps S308 and S337, the content in the NT region is converted from the binary code of 8-bits to the binary coded decimal code of 4-digits and is loaded in the TIME2 region.

Steps S317 and S354: As in the case of the previous steps S309 an S338, the timer time period information concerning the timer operation knob 162b is converted to the value in terms of a second unit and is loaded in the TIME2 region.

Steps S318 and S355: As in the case of the previous steps S310 and S339, the content in the TIME2 region is converted into the value in terms of the minute and second units.

Step S319: The content in the CLOCK region is transferred to the DISPLAY region. After such transfer the content in the CLOCK region is maintained.

Steps S324: It is determined whether the respective contents in the NT region and the OT1 region are equal to each other.

Step S328: A display is made by the display 15 and the same time key operation by the operation portion 16 is detected. More specifically, the outputs are in succession obtained at the input/output control terminals ODG1 to ODG5. At the same time, the contents of the respective digits of the DISPLAY region undergo code conversion in synchronism with the outputs obtained at these terminals ODG1 to ODG4 and the converted outputs are obtained from the display output terminals ODS1 to ODS7. At that time unnecessary zeros in the more significant digits are suppresed from being displayed. The content in the FLG2 region is determined and if the same is determined as the logic zero the output is obtained at the terminal ODG7 in synchronism with the output of the control terminal ODG5 for the purpose of displaying the current time, whereby a colon display is made by the display 15. On the other hand, in the case where key operation is made by the operation portion 16, the key operation is detected through the key signal input terminals IK1 to IK4 and the code corresponding to the said key is stored in the FKB region, while the logic one is loaded in the FLG3 region, whereby the fact of the key operation is stored.

Steps S340 and S427: The content in the TIME1 region is transferred to the DISPLAY region. Even after the above described transfer the content in the TIME1 region is maintained.

Steps S341 and S428: The outputs at the output terminals OLb and OLa of the microprocessor are set to be off and on, respectively.

Step S347: It is determined whether the respective contents in the NT region and the OT2 region are equal to each other.

Steps S356 and S425: The content in the TIME2 region is transferred to the DISPLAY region. Even after the above described transfer the content in the TIME2 region is maintained.

Step S357 and S426: The outputs of the output terminals OLa and OLb of the microprocessor are set to be off and on, respectively.

Step S362: The content in the FKB region is checked, whereby it is determined whether the same corresponds to the START key or not.

Steps S360, S401 and S537: An opened/closed state of the door 14 is checked through the input terminal IC1 of the microprocessor.

Steps S404 and S429: All the outputs at the output terminals OM, OH and OT of the microprocessor are turned off.

Steps S407 and S416: The output is generated with a 30% duty at the output terminal OM of the microprocessor. More specifically, on the occasion of a heat operation by a microwave, the program passes the steps S407 and S416 at the rate of a number of times per second, as will become apparent from the following description. On the occasion of the first passage of the steps S407 and S416, the output of the output terminal OM is turned on and on the occasion of the passage of the above described steps after the lapse of three seconds the output of the output terminal OM is turned off, whereupon on the occasion of the passage of the above described steps after the lapse of seven seconds thereafter again the output of the output terminal OM is turned on, whereupon the above described process is repeated. On the occasion of a heat operation the output is also obtained at the output terminal OT and the above described steps S407 and S416 are repeated, whereby the magnetron 105 makes oscillation with the cycle of 10 seconds, and for three seconds for each cycle. The oscillation output on that occasion is determined to be 180 W.

Step S408: The presence or absence of the input to the input terminal IC2 of the microprocessor is checked and in the presence of the input the output terminal OH is turned off, whereas in the absence of the input the output at the output terminal OH is turned on.

Step S409: The content of the TIME2 region is subtracted for every second. More specifically, as in the case of the previous step S407, on the occasion of a heat operation, the program passes the step S409 at the rate of a number of times per second, while the above described subtracting operation is made for each passage of one second.

Step S410: It is determined whether the content in the TIME2 region has become zero or not.

Step S411: The output of the output terminal OLb of the microprocessor is turned off.

Step S417: The output of the output terminal OM of the microprocessor is turned on.

Step S418: As in the case of the previous step S409, the content in the TIME1 region is subtracted for each second.

Step S419: It is determined whether the TIME1 region is zero.

Step S420: The output of the output terminal OLa of the microprocessor is turned off.

Step S430: The output is obtained for one second at the output terminal OB of the microprocessor, whereupon the program proceeds to the step S302.

Steps S502, S504 to S508 and S510: The content in the FKB region is checked at these steps to determine whether the same corresponds to any one of the CLEAR key, the START key, the MICROWAVE STRONG key, the MICROWAVE WEAK(A), the MICROWAVE WEAK(B) key, HEATER key, and the CLOCK FAST key. In the case where the same does not correspond to any one of them, the program determines the same as the CLOCK SLOW key and proceeds to the step S511.

Step S511 and S512: At these steps the content in the CLOCK region changes at the speed quicker than the normal speed. More specifically, since the least significant digit of the content of the CLOCK region is the minute unit, normally the content is renewed for every minute; however, at the step S511 the renewal is made for each second at the step S512 renewal is made for every 0.5 second.

In the following a control operation of the microprocessor will be described in more detail.

[1] Initiation of Power Supply and Current Time Setting

Upon initiation of a power supply to the microwave oven, the program proceeds through the steps S301 to S323 to the step S324. At that time the timer time period loaded at the steps S306 and S322 remains the same unless the timer operation knob 162a is turned. Accordingly, the program proceeds after the step S324 through the steps S325, S326, S328 to S330 to the step S331. Now assuming that no key operation is made by the operation portion 16, the program proceeds from the step S331 through the steps S332 and S333 to return to the step S319. The program further proceeds to the step S320. Since the content in the FLG6 region has become the logic one at that time through the step S326, the program then proceeds to the step S344. The timer time period loaded at the steps S314 and S345 remains the same unless the timer operation knob 162b is turned. Accordingly, the program proceeds after the step S347 through the steps S348 and S349 to return to the step S328. Accordingly, similarly thereafter the program makes alternately circulations of the first loop including the steps S319 to S326 and S328 to S333 and the second loop including the steps S319, S320, S344 to S349 and S328 to S333. In the course of the above described circulations, the content in the CLOCK region is transferred to the DISPLAY region at the step S319 and is displayed by the display 15 at the step S328. Although the content displayed is a current time display, the displayed current time is incorrect, since the current time setting has not been made at that time.

When the CLOCK FAST key or the CLOCK SLOW key is depressed for the purpose of setting the current time, the key operation is detected at the step S331 in the above described circulation process. Thereafter the program proceeds from the step S331 to the step S501, whereupon the program proceeds through the steps S502 to S510 and further through the step S511 or S512 to return to the step S319. Accordingly, insofar as the CLOCK FAST key or the CLOCK SLOW key is kept depressed, the program makes circulation of the steps S319 to S326 (or the steps S319, S320, S344 to S349) and the steps S328 to S331, S501 to S510 and S511 or S512, whereby a displayed current time in the display 15 quickly changes during that time period.

At the time point when the displayed current time reaches a corrent current time, the above described key is released from being depressed, whereupon the program again makes circulation of the above described first loop or the second loop, while the correct current time is displayed by the display 15. Such state is a standby state.

[II] Microwave Strong Heat Operation→Microwave Weak Heat Operation

Consider a case where a heat cooking operation is performed for 25 minutes with a microwave of a strong output (600 W) and then a heat cooking operation is performed for 40 minutes with a microwave of a weak output (180 W). In such a case, first of all the timer operation knobs 162a and 162b are set to the graduation positions of 25 minutes and 40 minutes, respectively, in the operation portion 16.

Assuming that the timer operation knob 162a is first operated, then such timer operation is detected at the step S324 in the above described standby state and the program then proceeds through the steps S327 to S332 and S334 to S343. More specifically, the new timer time period information of "25 minutes" is loaded in the TIME1 region at the step S339 and the same is also transferred to the DISPLAY region at the step S340. Furthermore, only the display lamp 161a is lighted at the step S341. The program then makes alternately circulations of the third loop including the steps S320, S344 to S349, S328 to S333 and the fourth loop including the steps S320 to S326, S328 to S333. During the circulation period the timer time period information of "25 minutes" is displayed at the step S328 and the display lamp 161a is also lighted, whereby it is notified that the displayed content in the display 15 contains the time period information associated with the timer operation knob 162a.

Assuming that the timer operation knob 162b is then operated, such operation is detected at the step S347 in the above described third loop circulation and the program then proceeds through the steps S350, S328 to S332 to S334, S351 to S358, S343. More specifically, the new timer time period of "40 minutes" is loaded in the TIME2 region at the step S355. At the same time the timer time period information is transferred to the DISPLAY region at the step S356 and only the display lamp 161b is lighted at the step S357. Thus the program thereafter makes alternately the circulations of the above described third and fouth loops, while the timer time period information of "40 minutes" is similarly displayed by the display 15 and the display lamp 161b is lighted, whereby it is notified that the displayed content in the display 15 contains the time period information associated with the timer operation knob 162b.

As for the order of operation of the timer operation knobs 162a and 162b, either may be earlier operated and the time period information designated by the knobs 162a and 162b is loaded in the respective TIME1 and TIME2 regions. The time period information of the last operated knob is displayed by the display 15 and the display lamp 161a or 161b is lighted, whereby it is indicated which knob the displayed content in the display 15 corresponds to.

Then the MICROWAVE STRONG key, the MICROWAVE WEAK(B) key, and the START key are operated in succession.

The key operation of the MICROWAVE STRONG key is detected at the step S331 in the above described circulations of the third and fourth loops. Then the program proceeds through the steps S501 to S505, S513, S515 to S517, S340 to S342, while the key operation of the MICROWAVE STRONG key is loaded at the step S513. The key operation of any one of the keys in the circle indicated as "BLOCK A" in the operation portion 16 is stored at the step S517. The content in the TIME1 region is transferred to the DISPLAY region at the step S340 and only the display lamp 161a is lighted at the step S341. Insofar as the MICROWAVE STRONG key is kept operated, the program makes alternately circulations of the loop including the steps S320, S344 to S349, S328 to S331, S501 to S505, S513, S515, S516, S518, S340 to S343 and the loop including the step S320 to S326, S328 to S331, S501 to S505, S513, S515, S516, S518, S340 to S343. When the above described key operation is released, the program makes alternately circulations of the fourth loop including the steps S320 to S326, S328 to S333 and the third loop including the steps S320, S344 to S349, S328 to S333. During the above described circulation processes, the time period information designated by the timer operation knob 162a is displayed by the display 15 and the display lamp 161a is lighted.

The following key operation of the MICROWAVE WEAK(B) key is detected at the step S331 in the course of the above described circulation processes of the third and fourth loops. Then the program proceeds through the steps S501 to S507, S523, S525 to S528, S356 to S358, S343, while the key operation of the MICROWAVE WEAK(B) key is stored at the step S523. The key operation of any keys in the circles indicated as "BLOCK A" and "BLOCK B" of the operation portion 16 is stored at the step S528. At the step S356 the content in the TIME2 region is transferred to the display region and at the step S357 only the display lamp 161a is lighted. Insofar as the MICROWAVE WEAK(B) key is kept operated, the program makes alternately circulations of the loop including the steps S320 to S326, S328 to S331, S501 to S507, S523, S525, S356 to S358, S343 and the loop including the steps S320, S344 to S349, S328 to S331, S501 to S507, S523, S525, S356 to S358, S343. When the above described key operation is released, the program makes alternately circulations of the fourth loop including the steps S320 to S326, S328 to S333 and the third loop including the steps S320, S344 to S349, S328 to S333. In the course of the above described circulation processes, the time period information designated by the timer operation knob 162b is displayed and the display lamp 161b is lighted.

The content in the FLG8 region remains the logic zero depending on the order of operation of the above described MICROWAVE STRONG key and the MICROWAVE WEAK(B) key. This means that the key in the circle indicated as "BLOCK A" of the operation portion 16 is operated prior to the operation of the key in the circle indicated as "BLOCK B".

The final operation of the START key is detected at the step S331 in the above described circulation processes of the third and fourth loops and the program then proceeds through the steps S501 to S504, S537 to S540. At that time, the transistor 145 (FIG. 14) is turned on at the step S539. The program then proceeds through the steps S320 to S326 (or the steps S320, S344 to S349), the steps S328 to S330, S401, S405, S415, S417 to S419, S424, S427, S428, S331. The transistor 131 is turned on at the step S417 and accordingly oscillation of the magnetron 105 is started.

Insofar as the START key is kept operated, the program proceeds after the step S331 to the step S501, whereupon the program proceeds through the steps S502, S503 to the step S332 and then returns from the step S333 to the step S320.

When the above described key operation is released, the program proceeds after the step S331 through the steps S332, S333 to return to the step S320. Thereafter, the program makes alternately circulations of the loop including the steps S320, S344 to S349, S328 to S330, S401, S405, S415, S417 to S419, S424, S427, S428, S331 to S333 and the loop including the steps S320 to S326, S328 to S330, S401, S405, S415, S417 to S419, S424, S427, S428, S331 to S333. At the step S418 the content in the TIME1 region is subtracted for each second and the content thereof is transferred to the DISPLAY region at the step S427, whereby the same is displayed at the step S328 as the timer left time period. The program proceeds through the step S428, when the display lamp 161a is lighted, whereby it is indicated that the displayed content in the display 15 relates to the timer operation knob 162a. Since the transistors 145 and 131 are kept on during that period, the magnetron 105 is enabled to make continuous oscillation, i.e. with 100% duty, thereby to provide a microwave of 600 W.

If and when the timer time period of "25 minutes" passes, so that the timer left time period becomes zero during the above described circulation processes, the same is detected at the step S419 and the program proceeds through the steps S420 to S426, S331 to S333, S320 to S326 (or the steps S320, S344 to S349), the steps S328 to S330, S401, S405 to the step S406. More specifically, this means that a microwave strong heat operation for 25 minutes is terminated.

The program then proceeds through the steps S407, S409, S410, S424 to S426, S331 to S333. Then the program makes alternately circulations of the loop including the steps S320 to S326, S328 to S330, S401, S405 to S407, S409, S410, S424 to S426, S331 to S333 and the loop including the steps S320, S344 to S349, S328 to S330, S401, S405 to S407, S409, S410, S424 to S426, S331 to S333. At the step S409, the content in the TIME2 region is subtracted for each second and the content thereof is transferred to the DISPLAY region at the steps S425, whereby the same is displayed at the step S328 as the timer left time period. When the program proceeds through the step S426, the display lamp 161b is lighted, whereby it is indicated that the displayed content in the display 15 relates to the timer operation knob 162b. Since the program proceeds through the step S407, the magnetron 15 is enabled to make oscillation with 30% duty, thereby to provide a microwave of 180 W.

When the timer time period of "40 minute" lapses in the above described circulation processes, whereby the timer left time period becomes zero, the same is detected at the step S410. The program then proceeds through the steps S411, S412, S429, S430 to the step S302. As a result, the transistors 143, 131 and 145 are all turned off, whereby a microwave weak heat operation for 40 minutes is terminated, whereupon it is notified by the buzzer 207 (FIG. 14) that all the operations are terminated.

Thereafter the microwave oven enters into the above described standby state and the current time is displayed by the display 15.

[III] Microwave Weak Heat Operation→Microwave Strong Heat Operation

Consider a case where a microwave heat operation of a strong output is performed after a microwave heat operation of a weak output is performed, i.e. in the reversed order as compared with the above described [II] heat operation. In such a case, as in the case of the previous example [II], suitable timer time periods are set by means of the timer operation knobs 162a and 162b. Then the MICROWAVE WEAK(B) key, the MICROWAVE STRONG key, and the START key are in succession operated.

Upon operation of the MICROWAVE WEAK(B) key, the program proceeds through the steps S507, S523, S525, S526, S529, S530. Upon further operation of the MICROWAVE STRONG key, the program proceeds through the steps S505, S513, S515, S516, S518, S519. Accordingly, if and when the START key is operated in such a case, the same as the previously described example [II] applies; however, the order of the heat operation is reversed, so that a microwave weak heat operation is first performed with 30% duty, whereupon a microwave strong heat operation is performed with 100% duty.

[IV] Microwave Strong Heat Operation→Heater Heat Operation

Now consider a case where a heat cooking operation is performed for 20 minutes with a strong output microwave and then a further heat cooking operation is performed for 30 minutes at the temperature of 200° C. by means of the heater. As in the case of the previously described example [II] timer operation knobs 162a and 162b are set to the graduation positions of "20 minutes" and "30 minutes". At the same time the temperature adjustment knob 163 is set to the graduation position of 200° C. and then the MICROWAVE STRONG key, the HEATER key and the START key are operated in succession.

Accordingly, the same processing as the above described example [II] is performed at the operation of the MICROWAVE STRONG key. Upon operation of the HEATER key the program proceeds through the steps S508, S524 to S528. Upon further operation of the START key, as in the case of the previously described example [II], first a strong output microwave is generated for 20 minutes, whereupon the program makes alternately circulations of the loop including the steps S320 to S326, S328 to S330, S401, S405, S406, S408 to S410, S424 to S426, S331 to S333 and the loop including the steps S320, S344 to S349, S328 to S330, S401, S405, S406, S408 to S410, S424 to S426, S331 to S333. At that time, as in the previously described examples, the timer left time period is displayed and the display lamp 161b is lighted. When the program proceeds through the step S406, the heater 137 is energized if and when the temperature in the cooking chamber 12 (FIG. 1) is lower than 200° C. and is deenergized when the temperature in the cooking chamber 12 (FIG. 1) is higher than 200° C. Accordingly, the temperature in the cooking chamber is maintained approximately at 200° C.

During the above described circulation processes, when the timer time period of "30 minutes" lapses, in the same manner the heater heating operation is terminated and it is notified by the buzzer 207 that all the operations are terminated, whereupon the microwave oven enters into the above described standby state.

[V] Heater Heating Operation→Microwave Strong Heat Operation

Now Consider a case where a microwave heat operation is performed with the strong output after the heater heat operation is performed, i.e. in the reversed order of the above described example [IV]. In such a case, as in the case of the previously described example [IV], the timer operation knobs 162a and 162b and the temperature adjustment knob 163 are set to suitable timer time periods and temperature and then the HEATER key, the MICROWAVE STRONG key, and the START key are operated in succession.

Upon operation of the HEATER key, the program proceeds through the steps S508, S524 to S526, S529, S530. Upon further operation of the MICROWAVE STRONG key, the program proceeds through the steps S505, S513, S515, S516, S518, S519. Accordingly, upon operation of the START key, as in the case of the previously described example [IV] but in the reversed order of the heat operation, first a heater heat operation is performed and then a microwave strong heat operation is performed.

[VI] Microwave Weak Heat Operation→Heater Heat Operation

Now consider a case where a heater heat operation is performed after a microwave heat operation is performed with the weak output. In such a case, as in the previously described examples, the timer time periods and the temperature are similarly and suitably set, and whereupon the MICROWAVE WEAK(A) key, the HEATER key, and the START key are operated in succession, as is readily apparent.

[VII] Heater Heat Operation→Microwave Weak Heat Operation

Now consider a case where a microwave heat operation is performed with the weak output after a heater heat operation is performed, i.e. in the reversed order of the above described example [VI]. In such a case, similarly the timer time periods and the temperature are suitably set, whereupon the HEATER key, the MICROWAVE WEAK(A) key, and the START key are operated in succession, as is readily apparent.

[VIII] Sole Heat Operation

Now consider a case where only a microwave heat operation is performed with the strong output. In such a case, the timer time period is set by the timer operation knob 162a, whereupon the MICROWAVE STRONG key and the START key are operated in succession. Now a consider a case where a microwave heat operation is performed with the weak output. In such a case, a timer time period is set by the timer operation knob 162a, whereupon the MICROWAVE WEAK(A) key, and the START key are operated, the timer time period is set by the timer operation knob 162a and then the MICROWAVE WEAK(B) key and the START key are operated. In order to perform a heater heat operation, first the timer operation knob 162b and the the timer operation knob 163 are operated to set the time period and the temperature, whereupon the HEATER key and the START key are in succession operated, as is readily apparent.

[IX] Clear Operation

Since the program usually proceeds through the steps S328 and S331, irrespective of whether the microwave oven has been performing a heat operation, the CLEAR key in the operation portion 16 may be operated at any time, when the program proceeds through the steps S331, S501, S502 to to return to the step S302, whereupon the microwave unconditionally enters into the standby state.

[X] Interruption of Performance of Heat Operation

Although opening of the door 14 (FIG. 1) of the microwave oven when the microwave oven is not in the heat operation does not affect the control operation by the microprocessor by any means, such opening of the door 14 interrupts the heat operation.

More specifically, since the program proceeds through the step S401 in the course of the heat operation, opening of the door 14 causes the program to proceed through the steps S401 to S404. The heat operation is then terminated at the step S404, whereupon the program makes circulation of the loop including the steps S320 to S326 (or the steps S320, S344 to S349) and the steps S328, S329, S360, insofar as the door 14 is kept open, whereby the timing operation by the timer is interrupted for that period.

When the door 14 is closed thereafter, the program makes circulation of the loop including the steps S320 to S326 (or the steps S320, S344 to S349), the steps S328, S329, S360, S361, S364, S333. When the START key is then operated, the program proceeds through the steps S360 to S363, S370 to enter to the step S539, whereby the above described heat operation is restarted.

In the above described embodiments, signals are applied to the common terminal 27 (FIG. 4) in the timer knobs 162a and 162b and the timer time period information was introduced from the first to eighth signal terminals 28a to 28h (FIG. 4) to the microprocessor in the form of a parallel bit signal; however, alternatively signals are entered into the first to eighth signal terminals 28a to 28h, while the timer time period information may be introduced from the common terminal 27 into the NT region of the microprocessor in the form of serial bit signal.

In the above described embodiments, the heater heat operation was controlled based on the temperature set by the temperature adjustment knob 163; however, a thermistor circuit for detecting a specific temperature, say 250° C., and a key in the circle indicated as "BLOCK B" in the operation portion 16 may be added for the purpose of performing a heater heat operation by fixing the above described specific temperature to a control reference temperature by means of the said key operation. In such a case, a thermistor of the above described thermistor circuit may be shared with a thermistor of the embodiment.

Meanwhile, as is apparent from the operation manners of the previously described examples [I] to [VII], particularly as apparent from the operation manners of the above described examples [I] and [II] described in detail, the embodiments have been adapted such that only when the positions of the timer operation knobs 162a and 162b are changed the new information is set to the TIME1 region and the TIME2 region. More specifically, since the program necessarily passes periodically through the steps S324 or S347 and the step S332 at the standby state for displaying the current time, the state attained after the timer operation knobs 162a and 162b are operated, the state attained after the key for a heat operation such as the MICROWAVE STRONG key is operated, and the heat operation state upon operation of the START key, the new timer time period information will be set in the TIME1 region and TIME2 region when the position of the timer operation knob is changed.

Since as described in the foregoing, the embodiment shown is adapted to detect a change of timer time period information caused when the timer means is displaced, whereupon the new timer time period information is set in the above described storing regions, a complicated key operation as in the conventional examples is not required in setting the timer time period, even if the apparatus is of an electronic controlled type, whereby the timer means may be simply operated and set to a desired position. Since the same applies even in the course of the above described operation, a change to a desired timer time period can be made instantaneously, with the result that an operating convenience can be much enhanced.

In the above described example [X], when the door 14 is opened in the course of the heat operation and then the timer operation knob 162a or 162b is operated while the door 14 is opened, then the same is stored at the step S327 or S350 in the course of the circulation of the loop including the steps S320 to S326 (or the steps S320, S344 to S349) the steps S328, S329, S360. When the door 14 is closed, the program proceeds through the steps S360, S361, S364, S365, S366 (or S367) and therefore the new timer time period information is entered in the OT1 and OT2 regions. When the START key is operated thereafter, the program proceeds through the steps S362, S363, S370, S539, S540 and S320, whereupon the program proceeds to the step S324 or S347. A change of the timer time period information is checked at these steps; however, since the new timer time period information by the operation of the above described timer operation knob has been loaded in the OT1 or OT2 region at the step S366 or S367, it is determined at the step S324 or S347 that there is no change and the program proceeds through the step S330 to the step S401, whereupon a heat operation is restarted. Accordingly, as described in the foregoing, even if the door is opened in the course of the heat operation and the timer operation knob 162a or 162b is moved while the door is opened, such change is disregarded.

Although in the above described embodiments a specific generator as shown in FIGS. 5A and 5B was employed as the signal generator 20, such may be of a simpler structure.

Figure 16:
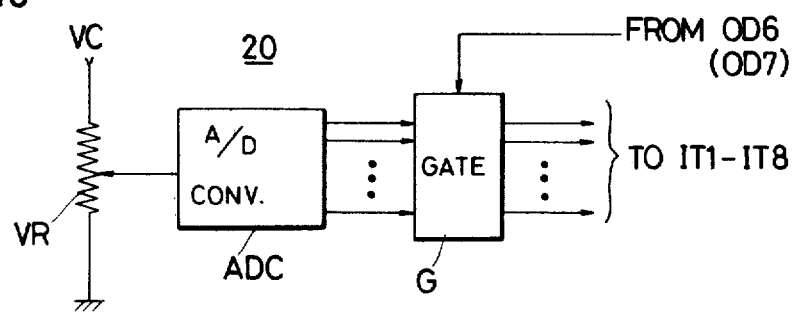
FIG. 16 is an outline block diagram showing another embodiment of the signal generator for use in the present invention.

FIG. 16 is a block diagram showing another embodiment of the signal generator for use in the present invention. The signal generator 20 comprises a variable resistor VR, an analog/digital converter ADC and a gate G. One end of the variable resistor VR is connected to the ground and the other end thereof is connected to receive a voltage Vc. Although not shown, the sliding contact of the variable resistor VR is coupled to a shaft provided to be rotatable or displaceable in association with an operation of the timer operation knob 19, 162a or 162b, such as the operation shaft 21 shown in FIG. 4, for example. A voltage drop across the variable resistor VR is applied to the analog/digital converter ADC. The analog/digital converter ADC serves to convert the magnitude of the given voltage to an associated digital signal. The analog/digital converter ADC is structured to provide the above described digital signal in the form of the Gray code, as previously described in conjunction with FIG. 5A. To that end, the analog/digital converter ADC may comprise a code converting means. The Gray code signal of 8 bits obtained from the analog/digital converter ADC is applied to the gate G. The gate G is also supplied with a pulse signal obtained from the output terminal OD6 (or OD7) of the microprocessor. More specifically, the gate G is responsive to the signal from the output terminal OD6 (or OD7) to be enabled, whereby the digital signal of 8 bits or the code signal obtained from the analog/digital converter ADC is applied to the input terminals IT1 to IT8 of the microprocessor in a bit parallel fashion at that timing. According to the FIG. 16 embodiment, it is not necessary to form the complicated conductive pattern 26 (FIG. 5A) and as a result a timer time period entry means can be implemented with a simple structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic controlled heat cooking apparatus, comprising:
    heat energy generating means for providing heating energy to a material being cooked,
    timer time period entry means for entering information concerning a timer time period and for defining a cooking time period by said heating energy provided by said heating energy generating means,
    said timer time period entry means comprising:
    a single timer setting means continuously displaceable over a predetermined range from its origin position to a selected point within said range operable for setting said timer time period to a selected time, said predetermined range being divided into a plurality of sections of minor unit displacement, said sections of said unit displacement corresponding to a predetermined multiple of a unit time period defined as a time period amount, and
    absolute code signal generating means cooperating with said setting means for providing an absolute code signal associated with the selected displaced amount from said origin position of said setting means, said absolute code signal generating means including means for generating a different absolute code signal for each of said unit displacement sections,
    timer time period storing means responsive to said absolute code signal from said absolute code signal generating means for storing said set timer time period,
    left time evaluating means responsive to said timer time period stored in said timer time period storing means and to an operation time period of said heating energy generating means for evaluating a left time period,
    control means responsive to said left time evaluated by said left time evaluating means for controlling said heating energy generating means, and
    display means for displaying said left time period evaluated by said left time period evaluating means.

2. An electronic controlled heat cooking apparatus in accordance with claim 1, wherein
    said timer time period storing means comprises means for determining said timer time period to be stored by multiplying said absolute code signal obtained from said absolute code signal generating means by said multiple of a unit time period.

3. An electronic controlled heat cooking apparatus in accordance with claim 1, wherein
    said predetermined range is divided into a plurality of relatively large sections each containing a plurality of said unit displacement sections, and
    said timer time period storing means comprises means responsive to the content of said absolute code signals for processing in a different manner the time period amounts of said unit displacement sections for each of said large sections.

4. An electronic controlled heat cooking apparatus in accordance with claim 3, wherein
    said timer time period storing means comprises determining means for determining which one of said large sections said absolute code signal from said absolute code signal generating means is associated with, and
    said processing means processes in a different manner said time period amounts associated with said unit displacement sections depending on the large section determined by said determining means.

5. An electronic controlled heat cooking apparatus in accordance with claim 4, wherein
said determining means comprises means for making said determination depending on whether said absolute code signal obtained from said absolute code signal generating means is included in a group of absolute code signals associated with a predetermined timer time period range.

6. An electronic controlled heat cooking apparatus in accordance with claim 4, wherein
said absolute code signal generating means comprises means for generating code signals representing said large sections, and
said determining means is adapted to make said determination depending on which of said code signals representing said large sections is generated.

7. An electronic controlled heat cooking apparatus in accordance with claim 1, wherein said absolute code signal generating means comprises
a conductive path pattern having a plurality of conductive paths extending over said predetermined range, including a conductive path common to said plurality of conductive paths, said plurality of conductive paths being sectioned relative to the unit displacement amount,
conductive contacts associated with the operation of said setting means for being in sliding contact simultaneously and individually with at least one of said plurality of conductive paths, and said common conductive path,
signal applying means for applying a signal to said plurality of conductive paths through said common conductive path and said conductive contacts, and
absolute code signal withdrawing means for withdrawing the applied signal from said plurality of conductive paths as an output absolute code signal,
said plurality of conductive paths being adapted such that the conductive surfaces are selectively in contact with said conductive contacts, whereby said code signal from said absolute code signal withdrawing means is different for each of said unit displacement amount sections.

8. An electronic controlled heat cooking apparatus in accordance with claim 1, wherein
said absolute code signal generating means comprises
a variable resistor including a sliding contact coupled to said setting means,
voltage applying means for applying a voltage to said variable resistor, and
analog/dvoltage varying in association with the displacement of said sliding contact of said variable resistor for generating a digital signal.

9. An electronic controlled heat cooking apparatus in accordance with claim 1 wherein
said setting means is structured to remain at the selected point to which it is displaced through an operation thereof after said operation is terminated.

10. An electronic controlled heat cooking apparatus in accordance with claim 9, which further comprises
operation detecting means for providing a detection output when an operation of said setting means is detected, and wherein
said timer time period storing means is jointly responsive to said absolute code signal and to said detection output for storing said timer time period based on the absolute code signal obtained from said absolute code signal generating means.

11. An electronic controlled heat cooking apparatus in accordance with claim 10, wherein
said operation detecting means comprises displacement detecting a change in means for detecting the displacement of said setting means.

12. An electronic controlled heat cooking apparatus in accordance with claim 11, wherein
said displacement detecting means provides said detection output when said generated absolute code signal changes.

13. An electronic controlled heat cooking apparatus in accordance with claim 1, wherein
said timer time period storing means comprises digital storage means responsive to the absolute code signal obtained from said absolute code signal generating means for storing in a digital manner said timer time period, and
said heat cooking apparatus further comprises time reference signal generating means for generating a time reference signal, said left time period evaluating means comprising subtraction means responsive to said time reference signal for decrementing the content in said timer time period storage means.

14. An electronic controlled heat cooking apparatus in accordance with claim 1, which further comprises
timing means for providing information concerning the current time, and
display switch means for switching a display of said display means,
said display means being responsive to said display switch means for selectively displaying at least one of said current time and said left time period.

15. An electronic controlled heat cooking apparatus in accordance with claim 14, which further comprises
operation detecting means for providing a detection output when an operation of said setting means is detected, and
wherein said display switching means is responsive to said operation detecting means for switching the display of said display means from said current time to said left time period.

16. An electronic controlled heat cooking apparatus in accordance with claim 15, wherein
said operation detecting means comprises displacement detecting means for detecting a change in the displacement of said setting means, and
said displacement detecting means provides said detection output when said generated absolute code signal changes.

17. An electronic controlled heat cooking apparatus in accordance with either claim 16 or 1, which further comprises
a cooking chamber for placement of said material being cooked,
door means for opening and closing an entrance to said cooking chamber,
opening/closing detecting means for detecting an open state of said door means, and
prohibiting means responsive to detection of the open state of said door means by said opening/closing detecting means for prohibiting the setting of said timer time period by said timer time period setting means.

18. An electronic controlled heat cooking apparatus in accordance with claim 1, which further comprises code variation detecting means for providing a detection output when a variation in said absolute code signal is detected, and wherein said timer time period storing means is jointly responsive to said absolute code signal and to said detection output of said code variation detecting means for storing said timer time period based on the absolute code signal obtained from said absolute code signal generating means.

19. An electronic controlled heat cooking apparatus, comprising:

heating energy generating means for providing heating energy to a material being cooked timer time period entry means for entering information concerning a timer time period and for defining a cooking time period by heating energy provided by said heating energy generating means, said timer time period entry means comprising a single timer setting means continuously displaceable over a predetermined range from its origin position to a selected point within said range operable for setting said timer time period to a selected time, said setting means being structured to remain at the selected point to which it has been displaced through an operation thereof afterwith said setting means for providing an absolute code signal associated with the selected displaced amount from said origin position of said setting means, timer time period storing means responsive to said absolute code signal obtained from said absolute code signal generating means for storing in a digital manner said timer time period, left time evaluating means responsive to said timer time period stored in said timer time period storing means and to an operation time period of said heating energy generating means for evaluating a left time period, timing means for providing information concerning the current time, display means for displaying at least one of said left time period evaluated by said left time period evaluating means and said current time, code variation detecting means for detecting variation of said absolute code signal, display switching means responsive to said code variation detecting means for switching the display of said display means from said current time to said left time period, and controlling means responsive to said left time period evaluated by said left time period evaluating means for controlling said heating energy generating means.

20. An electronic controlled heat cooking apparatus in accordance with claim 19, wherein said predetermined range of said setting means is divided into a plurality of sections of minor unit displacement, and said absolute code signal generating means comprises means for generating a different absolute code signal for each of said unit displacement sections, and said code variation detecting means comprises means responsive to said absolute code signal obtained from said absolute code signal generating means for detecting a variation of said absolute code signal.

21. An electronic controlled heat cooking apparatus in accordance with claim 20, wherein said code variation denoting means comprises output means for providing a detection output when it is detected that said absolute code signal has varied, and said display switching means is responsive to said detection output for switching said display from said current time to said left time period.

22. An electronic timer time apparatus for energizing a load being controlled for a preset timer time period, comprising:

a single timer setting means continuously displaceable over a predetermined range from its origin position to a selected point within said range operable for setting a selected timer time period, said setting means being structured to remain at the selected point to which it is displaced through an operation thereof after the operation is terminated, absolute code signal providing means cooperating with said setting means for providing a digital absolute code signal associated with the selected displacement amount of said setting means from said origin position, code variation detecting means responsive to said digital absolute code signal for providing a detection output when it is detected that said absolute code has varied, timer time period storing means responsive to said detection output of said code variation detecting means for storing said timer time period based on said digital absolute code signal, left time evaluating means responsive to said timer time period stored in said timer time period storing means and to an operation time period of said load being controlled for evaluating a left time period, control means responsive to said left time evaluated by said left time evaluating means for controlling said load being controlled, and display means for displaying said left time period evaluated by said left time period evaluating means.

23. An electronic timer apparatus in accordance with claim 22, wherein said predetermined range of said setting means is divided into a plurality of sections of minor unit displacement, and said digital absolute code signal providing means comprises means for generating a different absolute code signal associated with each of said unit displacement sections.

24. An electronic timer apparatus in accordance with claim 22, which further comprises timing means for providing information concerning the current time, and display switch means for switching the display by said display means from said current time to said left time period.

25. An electronic timer apparatus in accordance with claim 24, wherein said display switching means is adapted to be responsive to said code variation detecting means for switching the display by said display means from said current time to said left time period.

26. An electronic timer apparatus in accordance with claim 25, wherein said predetermined range of said setting means is divided into a plurality of sections of minor unit displacement.

27. An electronic timing apparatus comprising:

a timer setting means displaceable from its origin position over a predetermined range for setting a timer time period, said predetermined range comprising a plurality of subdivisions of minor unit displacement;

absolute code signal generating means cooperating with said setting means for providing a different absolute code signal associated with each of said subdivisions, each absolute code signal having a relative value compared to the other absolute code signals;

means for determining when the relative value of a generated absolute code signal exceeds a predetermined value and for generating a determination output in response thereto;

means for computing said timer time period associated with a displacement of said setting means by multiplying the relative value of said generated absolute code signal by a first multiple when said detection output is not generated and by a second multiple when said detection output is generated;

means for storing said computed timer time period;

means for generating a clock signal representing the passage of a unit time interval;

means responding to said clock signal for decrementing the timer time period stored in said storage means; and means for outputing the content of said storage means.

28. An electronic timing apparatus as in claim 27 wherein said absolute code signal generating means comprises:

a conductive path pattern having a plurality of conductive paths extending over said displacement range of said setting means;

brush means for establishing electrical connection between a common conductor and a plurality of said conductive paths at a plurality of locations along said displacement range;

means for selectively insulating parts of each of said conductive paths along said displacement range to prevent conduction of electricity from said brush means to said insulated parts of said conductive paths;

means for sliding said brush means along said plurality of conductive paths in response to displacement of said setting means;

signal applying means for applying a signal to said common conductor, and terminal means coupled to each of said plurality of conductive paths for outputing a digital absolute code signal from said conductive paths depending on the location of said brush means along said displacement range;

and wherein said timer setting means comprises a single setting means, continuously displaceable over said predetermined range from its origin position to a selected point within said range operable for setting said timer time period to a selected time.

29. A electronic timing apparatus as in claim 27, wherein the absolute code signal generator comprises:

a variable resistor including a sliding contact coupled to said setting means;

means for applying an electrical signal to said variable resistor, and analog to digital converting means responsive to the variation of said signal in association with the displacement of said sliding contact for generating said absolute code signal.

30. An electronic controlled heat cooking apparatus comprising:

heat energy generating means for providing heating energy to a material being cooked, timer means for entering information concerning a timer time period and for defining a cooking time period by said heating energy provided by said heating energy generating means, and control means responsive to said timer means for controlling said heat energy generating means to provide heating energy to said material being cooked for said cooking time period, said timer means comprising:

a single timer setting means continuously displaceable over a predetermined range from its origin position to a selected point within said range for setting a selected timer time period, said predetermined range comprising a plurality of subdivisions of minor unit displacement;

said setting means structured to remain at the selected point to which it has been displaced after said timer time period has been set;

absolute code signal generating means cooperating with said setting means for providing a different absolute code signal associated with each of said subdivisions, each absolute code signal having a relative value compared to the other absolute code signals;

means responsive to a generated absolute code signal for computing said selected timer time period associated with the displacement of said setting means;

means for storing said computed timer time period;

means for generating a clock signal representing the passage of a unit time interval;

means responding to said clock signal generator for decrementing the timer time period stored in said storage means to produce a remaining time period; and means for displaying said remaining time period stored in said storage means.

31. An electronic controlled heat cooking apparatus, comprising:

heat energy generating means for providing heating energy to a material being cooked, timer means for entering information concerning a timer time period and for defining a cooking time period by said heating energy provided by said heating energy generating means, and control means responsive to said timer means for controlling said heat energy generating means to provide heating energy to said material being cooked for said cooking time period, said timer means comprising:

a single timer setting means continuously displaceable over a predetermined range from its origin position to a selected point within said range for setting said timer time period to a selected time, said predetermined range comprising a plurality of subdivisions of minor unit displacement;

absolute code signal generating means cooperating with said setting means for providing a different absolute code signal associated with each of said subdivisions, each absolute code signal having a relative value compared to the other absolute code signals;

means responsive to a generated absolute code signal for computing said selected timer time period associated with the displacement of said setting means;

means for storing said computed timer time period;

means for outputting the content of said storing means;

timing means for determining the current time;

means for displaying one of at least said current time and said time period stored in said storing means; and means for switching said display means from displaying said current time to displaying said stored timer time period when the setting of said setting means is changed.

32. An electronic timing apparatus as in claim 27, wherein:

said setting means comprises a single setting means, continuously displaceable over said predetermined range from its origin position to a selected point within said range for setting a selected timer time period, said setting means structured to remain at the selected point to which it has been displaced after said timer time period has been set, and said electronic timer apparatus further comprises means responsive to said outputting means for displaying the remaining time period stored in said storing means.

33. An electronic timing apparatus as in either of claims 27 or 32 further comprising:

timing means for determining the current time;

means for displaying one of at least said current time and the timer time period stored in said storing means, and means for switching said display means from displaying said current time to displaying said timer time period when the setting of said setting means is changed.

34. An electronic controlled heat cooking apparatus including the electronic timing apparatus of claim 33/32, which further comprises:

heat energy generating means for providing heating energy to a material being cooked;

a cooking chamber for placement of said material being cooked;

door means for opening and closing an entrance to said cooking chamber;

opening/closing detecting means for detecting an open state of said door means, and prohibiting means responsive to detection of the open state of said door means for prohibiting the setting of a new timer time period by said setting means, and means for controlling said heating energy generating means responsive to the timer time period set by said setting means.

35. An electronic controlled heat cooking apparatus as in claim 34, wherein said absolute code signal comprises a Gray code signal.

* * * * *

UNITED STATES PATENT AND TRADEMARK OFFICE
CERTIFICATE OF CORRECTION

PATENT NO. : 4,367,387
DATED : January 4, 1983
INVENTOR(S) : Jin Tachihara and Hideaki Koyama It is certified that error appears in the above-identified patent and that said Letters Patent are hereby corrected as shown below:

In Claim 8: (Col.35, ln. 53) after "analog" delete "dvoltage" and insert --digital converting means responsive to the voltage--

In claim 11: (Col.36, ln.6) delete "a change in" and insert --a change in-- before "the" where that line will read as follows "ment detecting means for detecting a change in the"

In Claim 19: (Col.37, ln.25) insert --the operation is terminated, and-- after "after" and delete "with said setting means for providing an absolute code signal associated with the selected displaced amount from said origin position of said setting means"

In Claim 19: (Col. 37, ln 29) insert a paragraph before "timer time period..." as follows:

--absolute code signal generating means cooperating with said setting means for providing an absolute code signal associated with the selected displaced amount from said origin position of said setting means,--

In Claim 21: (Col. 38, ln.1) delete "denoting" and substitute --detecting--

Signed and Sealed this

Eleventh Day of October 1983

[SEAL]

Attest:

GERALD J. MOSSINGHOFF

Attesting Officer      Commissioner of Patents and Trademarks